US011964477B2

(12) United States Patent
Kodama

(10) Patent No.: US 11,964,477 B2
(45) Date of Patent: Apr. 23, 2024

(54) RECORDING SYSTEM, POST-PROCESSING APPARATUS, AND TRANSPORT APPARATUS

(71) Applicant: SEIKO EPSON CORPORATION, Tokyo (JP)

(72) Inventor: Hidetoshi Kodama, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 17/806,445

(22) Filed: Jun. 10, 2022

(65) Prior Publication Data

US 2022/0297422 A1 Sep. 22, 2022

Related U.S. Application Data

(63) Continuation of application No. 17/215,541, filed on Mar. 29, 2021, now Pat. No. 11,400,702, which is a (Continued)

(30) Foreign Application Priority Data

Dec. 4, 2015 (JP) ................................ 2015-237229

(51) Int. Cl.
*B41J 11/00* (2006.01)
*B41J 2/01* (2006.01)
(Continued)

(52) U.S. Cl.
CPC . *B41J 2/01* (2013.01); *B41J 3/60* (2013.01); *B41J 11/0015* (2013.01);
(Continued)

(58) Field of Classification Search
CPC ... B41J 2/01; B41J 3/60; B41J 11/0015; B41J 13/009; B41J 13/106; B41J 29/023; B65H 29/125; B65H 2301/33312
See application file for complete search history.

(56) References Cited

U.S. PATENT DOCUMENTS 6,201,946 B1 3/2001 Takeuchi et al.
7,651,092 B2 1/2010 Hirao et al.
(Continued)

FOREIGN PATENT DOCUMENTS

JP 2009-251186 10/2009
JP 2010-036995 2/2010
(Continued)

OTHER PUBLICATIONS

U.S. Appl. No. 15/368,228, Jul. 7, 2017, Office Action.
(Continued)

*Primary Examiner* — Yaovi M Ameh
(74) *Attorney, Agent, or Firm* — WORKMAN NYDEGGER

(57) ABSTRACT

A recording system includes: a recording apparatus; a post-processing apparatus; and a transport apparatus which transports the medium to which the recording is performed to the post-processing apparatus, and the transport apparatus includes a transport mechanism which transports a medium to which the recording is performed to the post-processing apparatus, and a loading stand which loads the discharged medium without transporting the medium to which the recording is performed to the post-processing apparatus.

15 Claims, 14 Drawing Sheets

Related U.S. Application Data continuation of application No. 16/560,709, filed on Sep. 4, 2019, now Pat. No. 11,001,055, which is a continuation of application No. 15/995,938, filed on Jun. 1, 2018, now Pat. No. 10,471,708, which is a continuation of application No. 15/368,228, filed on Dec. 2, 2016, now Pat. No. 10,052,867.

(51) Int. Cl.

| | |
|---|---|
| ***B41J 3/60*** | (2006.01) |
| ***B41J 13/00*** | (2006.01) |
| ***B41J 13/10*** | (2006.01) |
| ***B65H 29/12*** | (2006.01) |
| *B41J 29/02* | (2006.01) |

(52) U.S. Cl.

CPC ........... *B41J 13/009* (2013.01); *B41J 13/106* (2013.01); *B65H 29/125* (2013.01); *B41J 29/023* (2013.01); *B65H 2301/33312* (2013.01)

(56) References Cited

U.S. PATENT DOCUMENTS

| | | | | |
|---|---|---|---|---|
| 2002/0109289 | A1 | 8/2002 | Oikawa | |
| 2004/0109289 | A1 | 6/2004 | Oikawa | |
| 2005/0000336 | A1* | 1/2005 | Hattori | B26F 1/24 83/72 |
| 2007/0242987 | A1 | 10/2007 | Shida et al. | |
| 2007/0290427 | A1* | 12/2007 | Horii | B65H 45/142 270/32 |
| 2008/0174626 | A1* | 7/2008 | Hirao | G03G 15/6552 347/16 |
| 2009/0073211 | A1 | 3/2009 | Imoto | |
| 2010/0244354 | A1 | 9/2010 | Suh et al. | |
| 2014/0292979 | A1 | 10/2014 | Kodama et al. | |
| 2014/0294538 | A1 | 10/2014 | Kimura | |
| 2015/0168906 | A1 | 6/2015 | Ishii | |
| 2016/0062710 | A1 | 3/2016 | Thijssen | |
| 2017/0157953 | A1 | 6/2017 | Kodama | |

FOREIGN PATENT DOCUMENTS

| | | | | |
|---|---|---|---|---|
| JP | 2010036995 A | * | 2/2010 | B65H 31/00 |
| JP | 2010-235316 | | 10/2010 | |
| JP | 2013-071833 | | 4/2013 | |
| JP | 2015-083346 | | 4/2015 | |
| JP | 2015-190990 | | 11/2015 | |

OTHER PUBLICATIONS

U.S. Appl. No. 15/368,228, Nov. 8, 2017, Office Action.
U.S. Appl. No. 15/368,228, Apr. 9, 2018, Notice of Allowance.
U.S. Appl. No. 15/995,938, Feb. 8, 2019, Office Action.
U.S. Appl. No. 15/995,938, Jun. 5, 2019, Notice of Allowance.
U.S. Appl. No. 16/560,709, Oct. 9, 2020, Office Action.
U.S. Appl. No. 16/560,709, Jan. 28, 2021, Notice of Allowance.

* cited by examiner

RECORDING SYSTEM, POST-PROCESSING APPARATUS, AND TRANSPORT APPARATUS

BACKGROUND

1. Technical Field

The present invention relates to a recording system including: a recording apparatus which records an image on a medium, such as a paper sheet; and a post-processing apparatus which is connected to the recording apparatus, and performs post-processing with respect to the medium.

2. Related Art

In the related art, a printing system (recording system) which includes: a printing apparatus (recording apparatus) that prints (records) an image, such as a character or a picture, by making ink which is an example of liquid adhere onto a paper sheet which is an example of a medium; and a post-processing apparatus which performs post-processing to the paper sheet to which the printing is performed by the printing apparatus, is known. For example, in JP-A-2013-71833, a printing system which includes: a printing apparatus, a first post-processing apparatus which performs drying with respect to the paper sheet as first post-processing; and a second post-processing apparatus which performs stapling as second post-processing, is described.

The printing apparatus in the printing system of JP-A-2013-71833 includes: a first transport path in which the paper sheet on which an image is printed is transported toward the first post-processing apparatus; and a second transport path in which the paper sheet is transported toward a paper discharge tray attached to the printing apparatus. In other words, the printing system discharges the paper sheet to which the post-processing is not performed directly to the paper discharge tray from the printing apparatus without transporting the paper sheet to the first and the second post-processing apparatuses. The paper discharge tray is configured to be capable of mounting a plurality of paper sheets.

However, in the above-described printing system, since the paper discharge tray is attached to protrude from the recording apparatus on a side of the recording apparatus, the size of the printing system becomes large.

SUMMARY

An advantage of some aspects of the invention is to provide a recording system which can contribute to making the size thereof small.

Hereinafter, means of the invention and operation effects thereof will be described.

According to an aspect of the invention, there is provided a recording system including: a recording apparatus which has a recording head and a discharge path, records an image on a medium by the head, and discharges the medium from the discharge path; a post-processing apparatus which performs post-processing with respect to the medium on which the image is recorded by the recording apparatus; and a transport apparatus which transports the medium on which the image is recorded by the recording apparatus to the post-processing apparatus, in which the transport apparatus includes a transport mechanism which transports the medium transported to the inside of the transport apparatus via the discharge path to the post-processing apparatus, and a loading portion which is disposed above a part of the transport mechanism, and loads the medium on which the image is recorded via the discharge path.

According to the configuration, since it is possible to load the medium on which the image is recorded on the loading portion disposed above a part of the transport mechanism, compared to a configuration in which a paper discharge tray protrudes from the side of the recording apparatus, it is possible to contribute to making the size of the recording system small. In addition, the discharge path indicates, for example, a common discharge path 154. In addition, here, the loading portion may be 201*b*, or may be a part at which 201*b* and 201*d* are combined with each other.

In the recording system, it is preferable that the recording apparatus have a discharge port on a downstream side of the discharge path, and the loading portion be disposed below a lower side than the discharge port.

According to the configuration, after the medium on which the image is recorded is discharged from the discharge port, since it is possible to load the medium on the loading portion, it is possible to load a plurality of mediums on which the image is recorded.

In the recording system, it is preferable that the recording apparatus include a branch portion on the downstream side of the discharge path, a first discharge path which passes through the transport mechanism from the branch portion, a second discharge path which passes through a loading stand, and a pull-out portion, and the pull-out portion include the discharge path, the branch portion, the second discharge path, and the discharge port, and above the loading portion, the branch portion be capable of pulling out the pull-out portion from the recording apparatus to a position that overlaps a part of the loading portion.

According to the configuration, when eliminating a transport failure of the medium around the branch portion, it is possible to simply remove the medium by pulling out the pull-out portion which accommodates the branch portion to the upper part of the loading portion. In addition, here, the branch portion indicates a part illustrated by 190.

In the recording system, it is preferable that the transport mechanism have a lead-out path which extends upward from a lower part of the loading portion, and leads out the medium on which the image is recorded to the post-processing apparatus, and the lead-out path be provided further toward the post-processing apparatus side than the loading portion.

According to the configuration, it is possible to lead out the medium on which the image is recorded in accordance with the height of the post-processing apparatus.

In the recording system, it is preferable that a surface of a housing of the transport apparatus which accommodates the lead-out path configure a part of the loading portion.

According to the configuration, since the medium on which the image is recorded and which is discharged from the discharge port can abut against the surface of the housing of the transport apparatus, the end portions of the medium are easily arranged, and usability of a user is improved.

In the recording system, it is preferable that the lead-out path have a path which is curved in a projected shape with respect to the recording apparatus side, above the loading portion, and the curved path overlap a part of the loading portion in the vertical direction.

According to the configuration, since the lead-out path is curved in a projected shape with respect to the recording apparatus side, it is possible to reduce a curvature of the lead-out path. Therefore, when leading out the medium on which the image is recorded to the post-processing apparatus, a transport failure of the medium is unlikely to be generated.

Furthermore, above the loading portion, since a part of the lead-out path and a part of the loading portion overlap each other, it is possible to contribute to making the size of the recording system small.

In the recording system, it is preferable that the transport apparatus have a switching path which reverses the medium on which the image is recorded as a part of the path of the transport mechanism, and the loading portion be disposed to overlap the switching path in the vertical direction.

According to the configuration, since the loading portion and the switching path have an overlapping layout in the vertical direction, it is possible to contribute to making the size of the recording system small.

In the recording system, it is preferable that the loading stand be capable of switching a first state of covering an upper part of the transport apparatus, and a second state of exposing the upper part of the transport apparatus.

According to the configuration, since it is possible to expose the upper part of the transport apparatus, when eliminating a transport failure of the medium on the inside of the transport apparatus, it is possible to easily remove the medium having a transport failure from the inside of the transport apparatus.

Hereinafter, means of the invention and operation effects thereof will be described.

According to another aspect of the invention, there is provided a recording system including: a recording apparatus which records an image on a medium; a first post-processing apparatus which performs first post processing with respect to the medium on which the image is recorded by the recording apparatus; and a second post-processing apparatus which performs second post-processing with respect to the medium to which the first post-processing is performed by the first post-processing apparatus, in which the first post-processing apparatus includes a housing having an upper surface portion that covers an upper part thereof, in which the recording apparatus includes a first transport path in which the medium on which the image is recorded by the recording apparatus is transported to the first post-processing apparatus, and a second transport path which branches from the first transport path, and is positioned above the first transport path, in which the upper surface portion is disposed on a side of the recording apparatus, and in which the medium which passes through the second transport path is loaded on an upper surface.

According to the configuration, since the upper surface portion which covers the upper part of the first post-processing apparatus functions as a paper discharge tray on which the medium on which the image is recorded is mounted, compared to a configuration in which the paper discharge tray protrudes from the side of the recording apparatus, it is possible to contribute to making the recording system small.

In the recording system, it is preferable that the housing have an extending portion which protrudes further upward than the upper surface portion at a part at which the first post-processing apparatus and the second post-processing apparatus are adjacent to each other, the first post-processing apparatus include a third transport path which transports the medium from the first post-processing apparatus to the second post-processing apparatus, on the inside of the extending portion, a linking path which is linked to the second post-processing apparatus in the third transport path be disposed, the linking path have a curved first part on the recording apparatus side, and a curved second part on the second post-processing apparatus side further toward the downstream side than the first part, and above the first part, and a part of the upper surface portion be positioned below the first part.

For example, in a case where the linking path is bent in the horizontal direction after extending straightly upward from below, and is oriented toward the second post-processing apparatus, a bending angle becomes a substantially right angle, and the curvature increases. In addition, as the curvature of the path increases, a transport failure of the medium is likely to be generated in the linking path. According to the configuration, since the linking path disposed on the inside of the extending portion is curved on the recording apparatus side, it is possible to reduce the curvature of the linking path. Therefore, a transport failure of the medium is unlikely to be generated.

In the recording system, it is preferable that at least a part of the upper surface portion be configured to be capable of switching a positional state between a first positional state of covering an upper part of the first post-processing apparatus, and a second positional state of exposing the upper part of the first post-processing apparatus.

According to the configuration, since it is possible to switch the positional state of the upper surface portion, and to expose the upper part of the first post-processing apparatus, when eliminating a transport failure of the medium on the inside of the first post-processing apparatus, it is possible to easily remove the medium having a transport failure from the inside of the first post-processing apparatus.

In the recording system, it is preferable that the recording apparatus be configured to be capable of pulling out at least a part of the first transport path and the second transport path further upward than the upper surface portion of the first post-processing apparatus.

According to the configuration, when eliminating a transport failure of the medium of at least a part of the first transport path and the second transport path, it is possible to easily remove the medium by pulling out at least a part of the first transport path and the second transport path further upward than the upper surface portion.

In the recording system, it is preferable that the housing cover the recording apparatus together with the first post-processing apparatus.

According to the configuration, it is possible to make the housing of the first post-processing apparatus and the housing of the recording apparatus common.

In the recording system, it is preferable that the housing cover the second post-processing apparatus together with the first post-processing apparatus.

According to the configuration, it is possible to make the housing of the first post-processing apparatus and the housing of the second post-processing apparatus common.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a printing system which serves as a recording system will be described with reference to the drawings.

Figure 1:
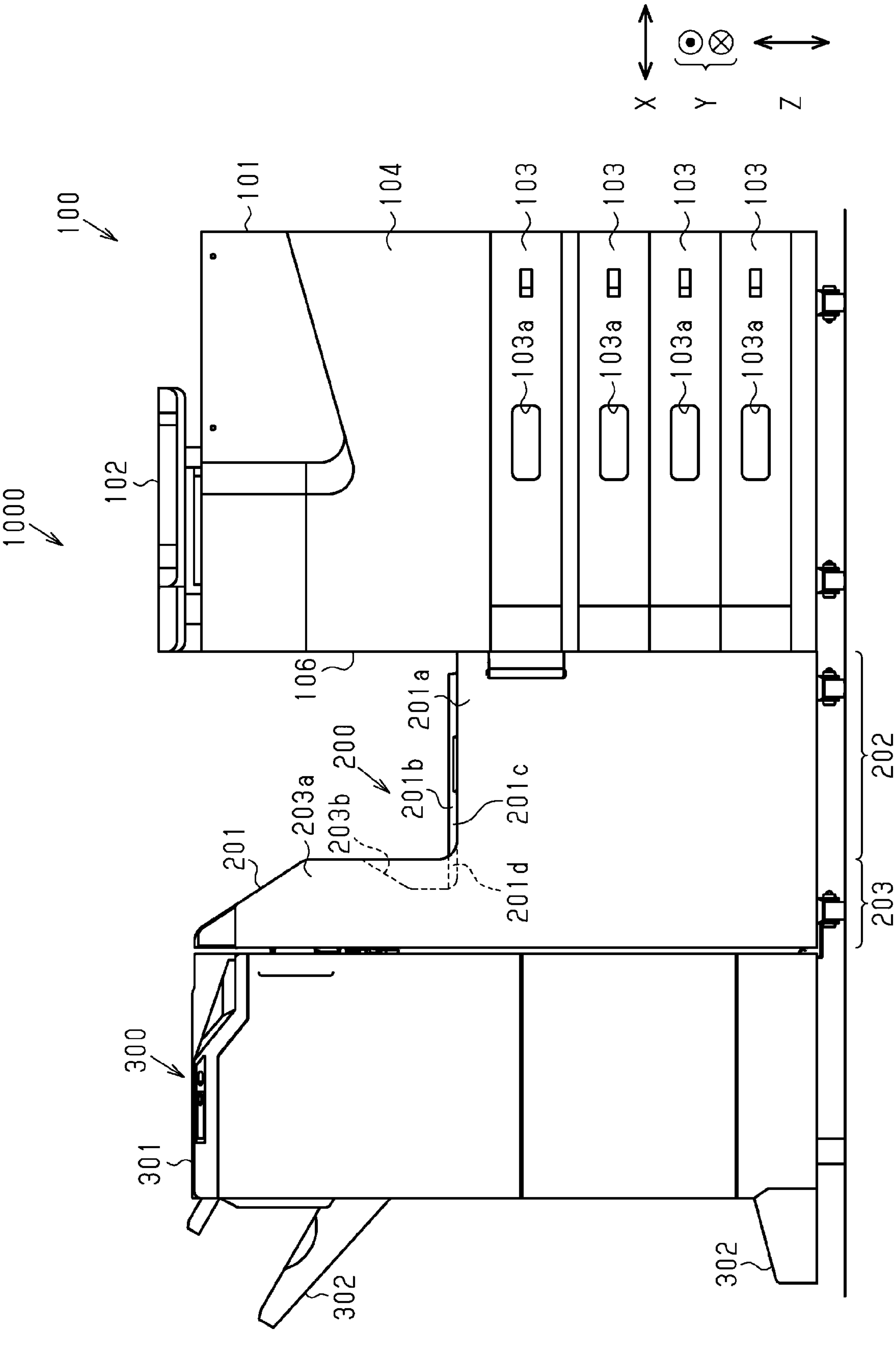
FIG. 1 is a front view illustrating an external appearance of an embodiment of a recording system provided with a recording apparatus.
Figure 2:
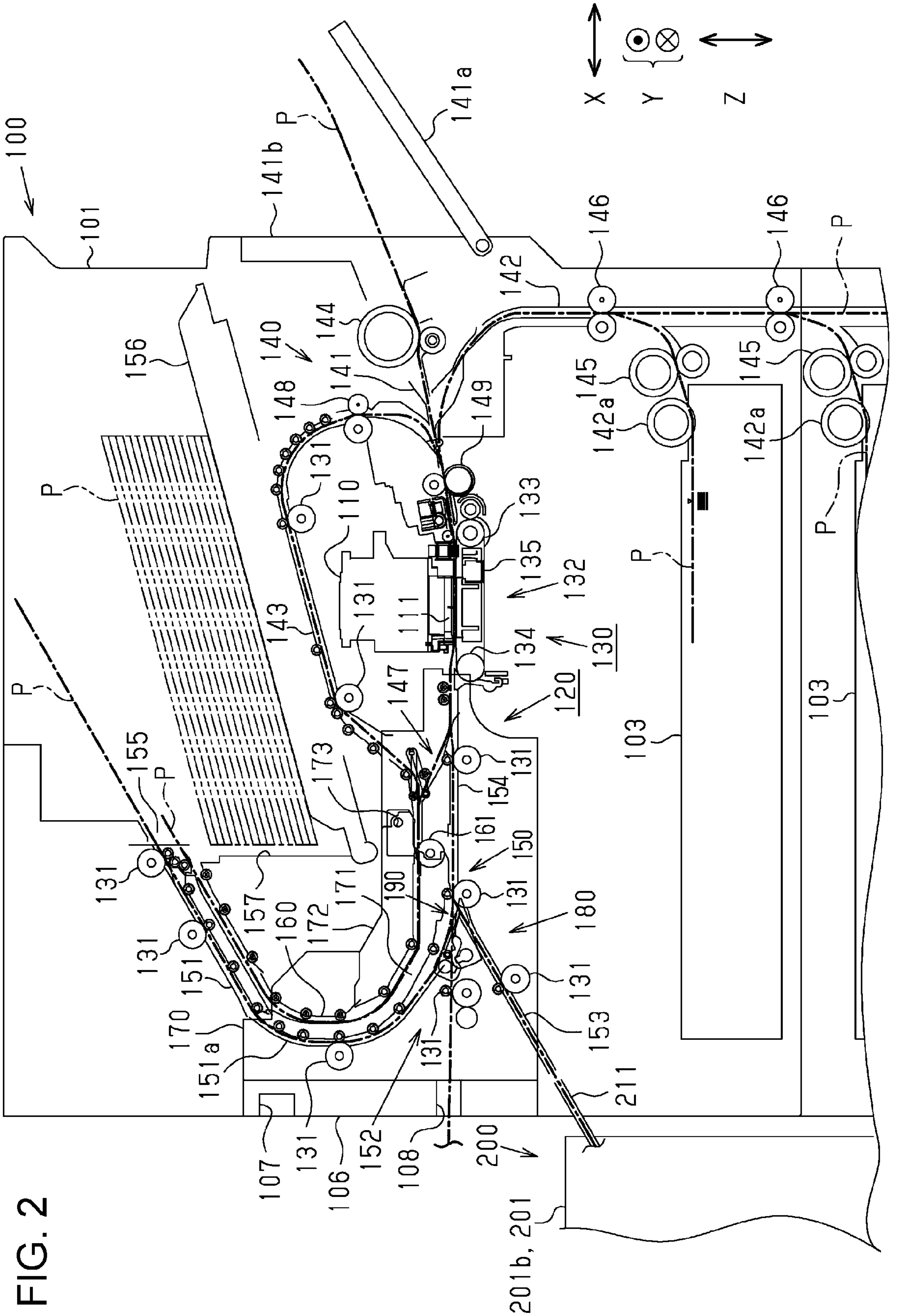
FIG. 2 is a schematic structure view of a printer.

As illustrated in FIGS. 1 and 2, a printing system 1000 includes: a printer 100 which is an example of a recording apparatus that records an image on a paper sheet P which is an example of a medium; a first post-processing apparatus 200 which performs first post-processing with respect to the paper sheet P on which the image is recorded by the printer 100; and a second post-processing apparatus 300 which performs second post-processing with respect to the paper sheet P to which the first post-processing is performed by the first post-processing apparatus. The printing system 1000 is configured as the printer 100, the first post-processing apparatus 200, and the second post-processing apparatus 300 are disposed to be aligned in order from a right side to a left side in the leftward-and-rightward direction X in FIG. 1. In other words, in the embodiment, by considering the leftward-and-rightward direction X which becomes the transport direction of the paper sheet P to which the recording is performed, as the alignment direction, the printer 100 and the first post-processing apparatus 200 are adjacent to each other, the first post-processing apparatus 200 and the second post-processing apparatus 300 are adjacent to each other, and the first post-processing apparatus 200 is disposed between the printer 100 and the second post-processing apparatus 300.

The printer 100 is an ink jet type printer which records an image, such as a character or a picture, by making ink which is an example of liquid adhere onto the paper sheet P, and is accommodated in a recording apparatus side housing 101 having a rectangular parallelepiped shape. In the vertical direction Z, an operation portion 102 for performing various operations of the printer 100 is attached to an upper portion of the recording apparatus side housing 101.

In the printer 100, in the vertical direction Z, a paper cassette 103 is provided across a lower portion from a center portion of the printer 100. In the embodiment, four paper cassettes 103 are disposed being aligned in the vertical direction Z, and the paper sheets P onto which the printer 100 performs the recording are accommodated in a stacked state in each of the paper cassettes 103. In addition, in the center portions in the leftward-and-rightward direction X in the paper cassettes 103, grip portions 103*a* which can be gripped by a user are respectively formed. In other words, the paper cassette 103 is configured to be insertable into the recording apparatus side housing 101 in a forward-and-rearward direction Y which intersects both the leftward-and-rightward direction X and the vertical direction Z. In addition, the paper sheets P accommodated in each paper cassette 103 may be different types from each other, and may be the same type.

In the vertical direction Z, at a position adjacent to the uppermost paper cassette 103, a front plate cover 104 is provided. The front plate cover 104 is provided to be rotatable by using a long side adjacent to the paper cassette 103 as a base end, and is configured to be freely rotated between two positions, that is, an open position at which a tip end side, which becomes a side opposite to the base end, is separated from the printer 100, and a closed position which configures a part of the recording apparatus side housing 101. When the front plate cover 104 is at the open position, a part of a transport path 120 (refer to FIG. 2) of the paper sheet P on the inside of the printer 100, is exposed. Therefore, by opening the front plate cover 104, when a transport failure of the paper sheet P is generated in the transport path 120, it is possible to remove the paper sheet P.

As illustrated in FIG. 2, in the printer 100, on a left side surface which is a surface to which the first post-processing apparatus 200 is attached and which is a surface on a left side in the leftward-and-rightward direction X, a pull-out surface portion 106 which configures a part of a side wall of the recording apparatus side housing 101 and can be pulled out from the recording apparatus side housing 101 is provided. In the upper portion in the vertical direction Z in the pull-out surface portion 106, a handle portion 107 which the user can hook the hand is formed. When the pull-out surface portion 106 is pulled out from the recording apparatus side housing 101 along the pulling-out direction which is oriented leftward in the leftward-and-rightward direction X, being interlocked with this, a pull-out unit 170 which will be described later is pulled out from the recording apparatus side housing 101 (refer to FIGS. 9 and 10).

In addition, as illustrated in FIG. 2, in the pull-out surface portion 106, at a position which becomes the lower side in the vertical direction Z in the handle portion 107, a discharge port 108 which discharges the paper sheet P on which the recording is performed is formed. The discharge port 108 is formed on the first post-processing apparatus 200 side. Therefore, the paper sheet which is discharged from the discharge port 108 is discharged toward a first housing 201 of the first post-processing apparatus 200.

As illustrated in FIG. 1, in the leftward-and-rightward direction X which is the alignment direction, the first post-processing apparatus 200 which is attached to the left side of the printer 100 is provided with the first housing 201. The first post-processing apparatus 200 performs the first post-processing with respect to the paper sheet P on which the recording is performed by the printer 100.

The first post-processing in the embodiment is drying of the paper sheet P. The first post-processing apparatus 200 dries the paper sheet P by transporting the paper sheet P for a predetermined period or longer. Therefore, by gaining the transport time of the paper sheet P, it is possible to suppress a level of curl generated on the paper sheet P due to the recording performed by a recording portion 110.

The first housing 201 includes: a box-like main body portion 201*a* of which a part of the upper part is open; and an upper surface portion 201*b* including a first plate-like member 201*c* and a second plate-like member 201*d* which are provided to be freely opened and closed in an upwardly opening portion of the main body portion 201*a*. In other words, the upper surface portion 201*b* covers at least the upper part of the first post-processing apparatus 200 in a first positional state where the first plate-like member 201*c* shuts the upwardly opening portion of the main body portion 201*a*. At this point, in the embodiment, the first housing 201 corresponds to an example of "housing having at least the upper surface portion 201*b* which covers the upper part of the first post-processing apparatus 200".

The main body portion 201*a* is configured to include a lead-in portion 202 which leads the paper sheet P on which the recording is performed by the printer 100, and a lead-out portion 203 which is positioned further toward the left side (downstream side in the transport direction) in FIG. 1 in the leftward-and-rightward direction X than the lead-in portion 202, and leads out the paper sheet P to the second post-processing apparatus 300.

The lead-in portion 202 is provided to be larger than the lead-out portion 203 in the leftward-and-rightward direction X, and is provided to be smaller than the lead-out portion 203 in the vertical direction Z.

As illustrated in FIG. 2, in a state where the lead-in portion 202 is disposed being aligned with the printer 100 in the leftward-and-rightward direction X, the lead-in portion 202 is provided so that the height of the lead-in portion 202 is between an upper portion of the uppermost paper cassette 103 and a lower portion of the pull-out surface portion 106, which are provided in the printer 100, in the vertical direction Z, and the height of the lead-out portion 203 is substantially the same as that of the printer 100. In other words, in a state where the lead-in portion 202 is attached to the adjacent printer 100 in the leftward-and-rightward direction X, the height of the lead-in portion 202 in the vertical direction Z is low so as not to interfere with the movement of the pull-out surface portion 106 in a pulling-out direction.

Figure 6:
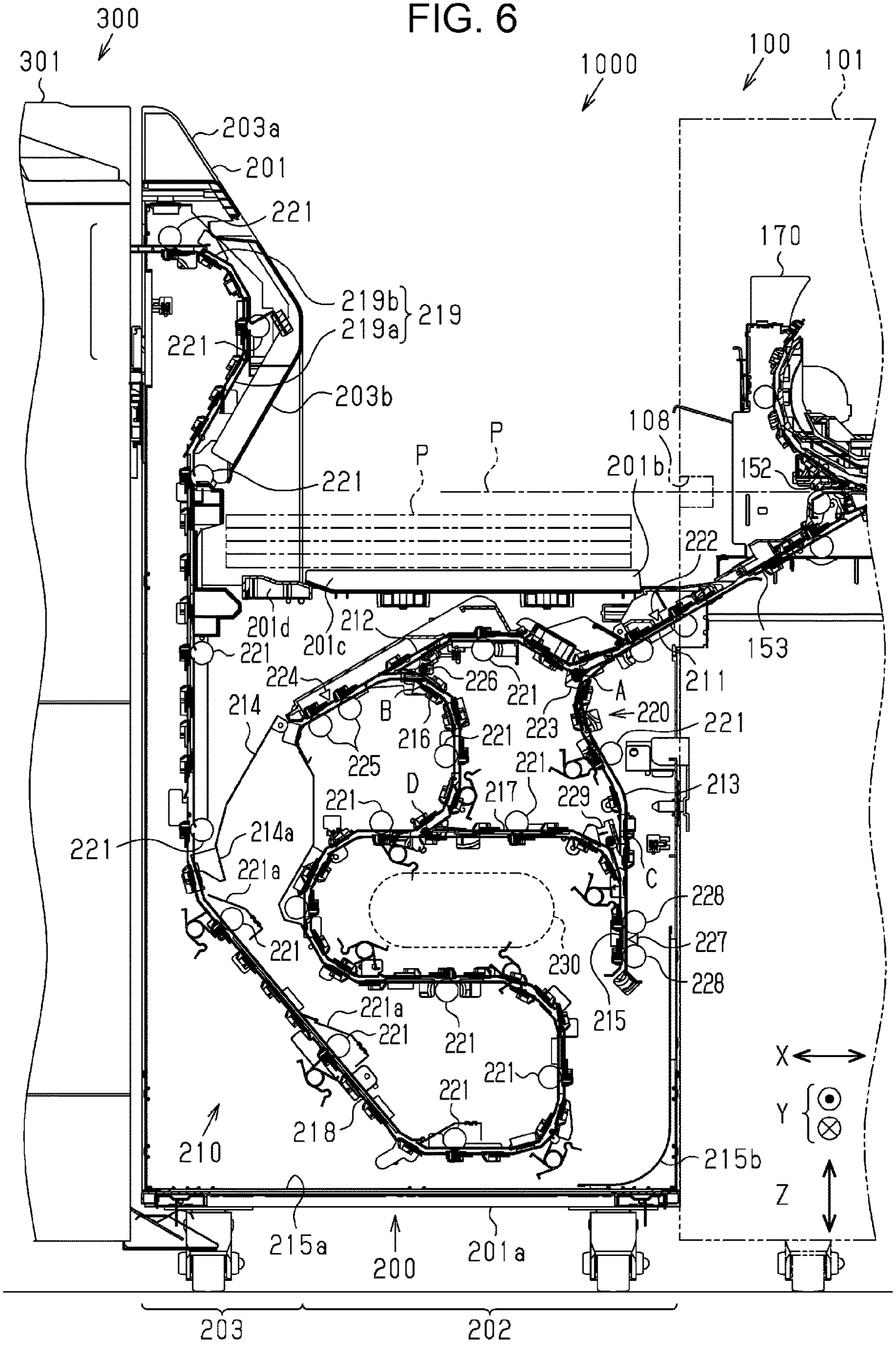
FIG. 6 is a schematic structure view of a first post-processing apparatus.
Figure 7:
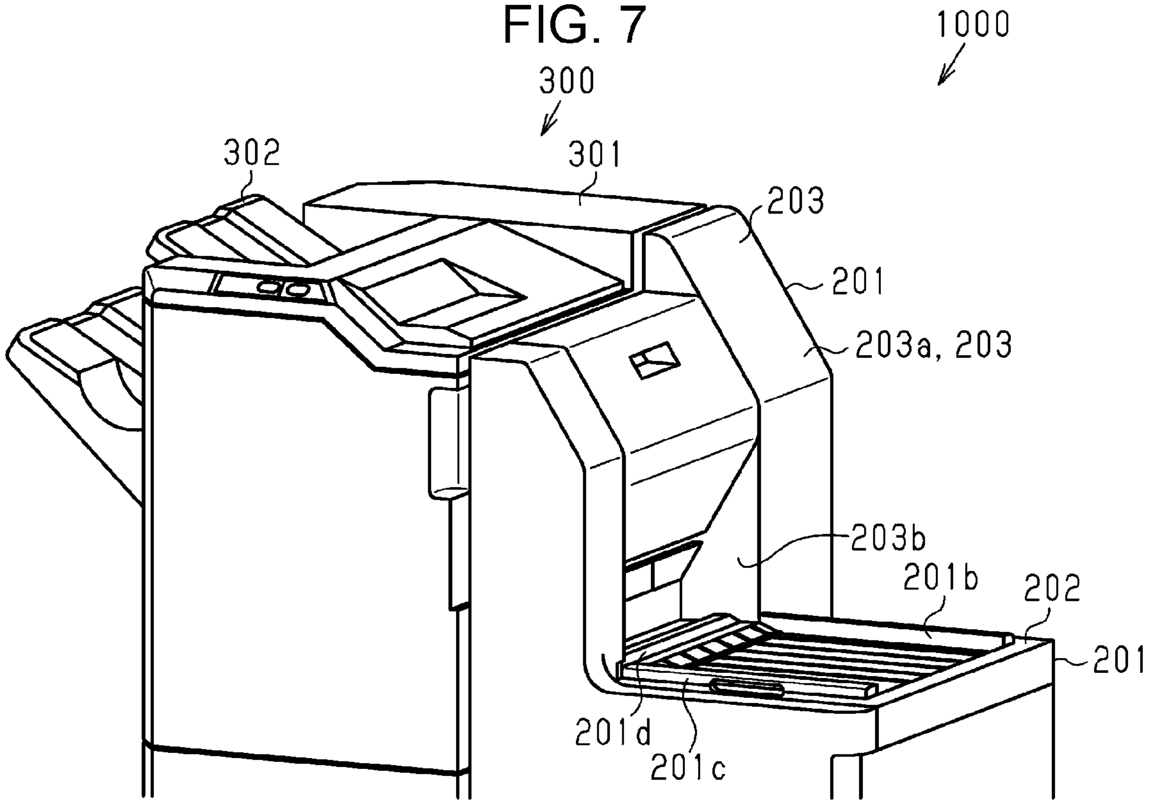
FIG. 7 is a perspective view of the first post-processing apparatus when an upper surface portion is in a first positional state.
Figure 8:
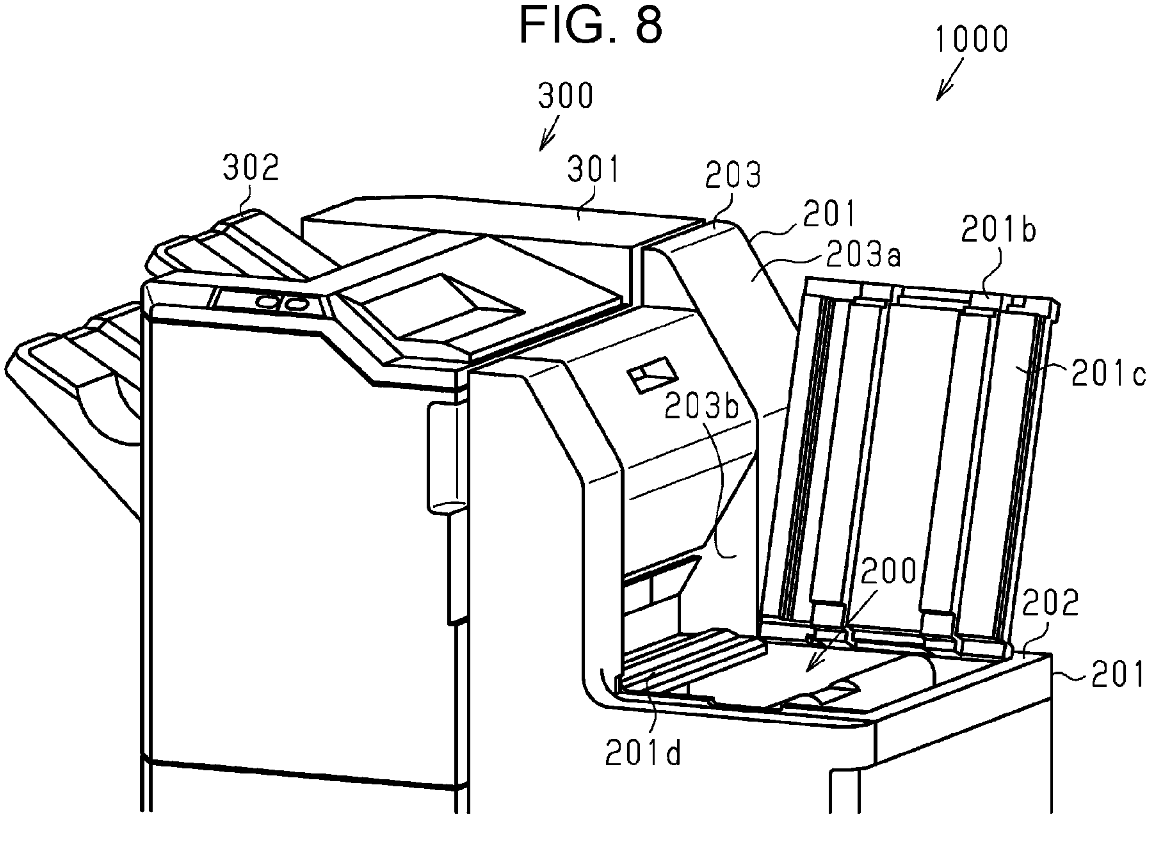
FIG. 8 is a perspective view of the first post-processing apparatus when the upper surface portion is in a second positional state.

In addition, the upper surface portion 201*b* includes the first plate-like member 201*c* which is provided at a part adjacent to the recording apparatus side housing 101, and the second plate-like member 201*d* which is provided to be adjacent to the first plate-like member 201*c*, and to be further toward a side (left adjacent side of the first plate-like member 201*c*) separated from the recording apparatus side housing 101 than the first plate-like member 201*c*. The upper surface portion 201*b* is configured to be capable of exposing the upper part of the first post-processing apparatus 200 as a positional state of the first plate-like member 201*c* which is a part of the upper surface portion 201*b* is switched from a first positional state of shutting the upwardly opening portion of the main body portion 201*a* to a second positional state of opening the opening portion. Specifically, the first plate-like member 201*c* is attached to one end side in the forward-and-backward direction Y of the main body portion 201*a* via a hinge or the like (not illustrated). Therefore, the upper surface portion 201*b* can switch the first positional state where the first plate-like member 201*c* shuts the upward opening portion of the first housing 201 (main body portion 201*a*), and covers the upper part of the first post-processing apparatus 200, as illustrated in FIGS. 6 and 7, to the second positional state where the upwardly opening portion is open, and the upper part of the first post-processing apparatus 200 is exposed, as illustrated in FIG. 8. In addition, the second plate-like member 201*d* is provided to be fixed to the main body portion 201*a*. When the first plate-like member 201*c* is in the first positional state, a left end portion on the second plate-like member 201*d* side is loaded on the upper surface of a right end portion of the second plate-like member 201*d* to be hooked. Therefore, when the first plate-like member 201*c* is in the first positional state, the first plate-like member 201*c* and the second plate-like member 201*d* are continuous to each other in the leftward-and-rightward direction X.

As illustrated in FIG. 1, the plate-like member of the upper surface portion 201*b* is attached to the main body portion 201*a* so as to be substantially parallel to a plane along the leftward-and-rightward direction X and the forward-and-rearward direction Y in the first positional state in the first positional state.

In addition, when the first plate-like member 201*c* is in the first positional state, the upper surface of the upper surface portion 201*b* is positioned below the discharge port 108. Therefore, on the upper surface of the upper surface portion 201*b*, the paper sheet P which passes through a second discharge path 152 is loaded. Specifically, as the paper sheet P discharged from the discharge port 108 is dropped on the upper surface of the upper surface portion 201*b*, the paper sheet P is stacked on the upper surface portion 201*b*.

As illustrated in FIG. 1, the lead-out portion 203 is further provided with an extending portion 203*a* which protrudes further upward than the upper surface portion 201*b* at a part adjacent to the second post-processing apparatus 300. The extending portion 203*a* is provided with a recess portion 203*b* which is recessed on the second post-processing apparatus 300 side on a surface on the printer 100 side, that is, at a part on a lower side in the vertical direction Z. In addition, a part of the upper surface portion 201*b* is disposed on the inside of the recess portion 203*b*. More specifically, the second plate-like member 201*d* which is an end portion on the second post-processing apparatus 300 side of the upper surface portion 201*b* is positioned in the lower end portion of the recess portion 203*b*. In addition, the first plate-like member 201*c* which is movable with respect to the main body portion 201*a* of the upper surface portion 201*b* is disposed on the outside of the recess portion 203*b*. Therefore, the inner wall of the recess portion 203*b* does not interfere with the switching of the positional state of the first plate-like member 201*c* from the first positional state to the second positional state.

In the leftward-and-rightward direction X which is the alignment direction, the second post-processing apparatus 300 attached to the adjacent side (left adjacent side in FIG. 1) of the first post-processing apparatus 200 is accommodated in a second housing 301 having a rectangular parallelopiped shape. The second post-processing apparatus 300 performs the second post-processing with respect to the paper sheet P on which the recording is performed by the printer 100 and which is transported by the first post-processing apparatus 200. Examples of the second post-processing include cutting, folding, punching, stapling, and sorting. In addition, the paper sheet P, to which the second post-processing is performed, is loaded on a paper discharge portion 302 which extends leftward from the left side surface of the second post-processing apparatus 300.

Next, a structure of the printer 100 will be described.

As illustrated in FIG. 2, in the recording apparatus side housing 101 provided in the printer 100, a recording portion 110 which performs the recording from the upper side in the vertical direction Z onto the paper sheet P, and a transport portion 130 which transports the paper sheet P along a transport path 120 are provided. The transport path 120 is formed so that the paper sheet P is transported by considering a direction that intersects a width direction as the transport direction, when a direction along the forward-and-rearward direction Y is considered the width direction of the paper sheet P.

The recording portion 110 is provided with a line head type recording head 111 which can dispense the ink at the same time across substantially the entire region of the paper sheet P in the width direction, at a lower part thereof. The recording portion 110 forms an image on the paper sheet P as the ink dispensed from the recording head 111 and adheres to a recording surface (a surface on which the image is printed) which opposes the recording head 111 on the paper sheet P.

The transport portion 130 includes a plurality of transport roller pairs 131 which are disposed along the transport path 120, and a belt transport portion 132 which is provided immediately below the recording portion 110. In other words, with respect to the paper sheet P transported by the belt transport portion 132, the ink is dispensed from the recording head 111 and the recording is performed.

The belt transport portion 132 includes a driving roller 133 which is disposed further toward the upstream side than the recording head 111 in the transport direction; a driven roller 134 which is disposed further toward the downstream side than the recording head 111 in the transport direction; and an endless circular belt 135 which is wound around each of the rollers 133 and 134. The belt 135 revolves as the driving roller 133 is driven to be rotated, and the paper sheet P is transported to the downstream side by the revolving belt 135. In other words, an outer circumferential surface of the belt 135 functions as a supporting surface which supports the paper sheet P on which the recording is performed.

The transport path 120 includes a supply path 140 through which the paper sheet P is transported toward the recording portion 110; a discharge path 150 through which the paper sheet P on which the recording is performed and the recording has been completed by the recording portion 110 is transported; and a branch path 160 which branches from the discharge path 150.

The supply path 140 includes a first supply path 141, a second supply path 142, and a third supply path 143. In the first supply path 141, the paper sheet P inserted from an insertion port 141*b* which is exposed by opening a cover 141*a* provided on the right side surface of the recording apparatus side housing 101, is transported to the recording portion 110. A first driving roller pair 144 is provided in the first supply path 141, and the paper sheet P inserted from the insertion port 141*b* is linearly transported toward the recording portion 110 as the first driving roller pair 144 is driven to be rotated.

In the second supply path 142, the paper sheets P which are accommodated in each of the paper cassettes 103 provided in the lower portion of the recording apparatus side housing 101 are transported to the recording portion 110 in the vertical direction Z.

In the vicinity of each paper cassette 103 in the second supply path 142, a pickup roller 142*a* and a separation roller pair 145 are provided. Among the paper sheets P accommodated in a stacked state on the paper cassettes 103, the uppermost paper sheet P is sent out by the pickup roller 142*a*, and the paper sheets P are separated one by one by a separation roller pair 145. Then, while reversing the posture in the vertical direction Z, the paper sheets P are transported toward the recording portion 110 as a second driving roller pair 146 provided in the second supply path 142 is driven to be rotated.

In the third supply path 143, in a case where duplex printing which records the image on both surfaces of the paper sheet P is performed, the paper sheet P on which the recording has been completed on one surface by the recording portion 110 is transported to the recording portion 110 again. In other words, further toward the downstream side than the recording portion 110 in the transport direction, the branch path 160 which branches from the discharge path 150 is provided. In other words, when performing the duplex printing, the paper sheet P is transported to the branch path 160 by an operation of a branch mechanism 147 provided in the middle of the discharge path 150. In addition, in the branch path 160, a branch path roller pair 161 which can rotate both normally and reversely is provided further toward the downstream side than the branch mechanism 147.

When performing the duplex printing, the paper sheet P of which one surface is printed is guided to the branch path 160 by the branch mechanism 147, and is transported to the downstream side in the branch path 160 by the branch path roller pair 161 which normally rotates. After this, the paper sheet P transported to the branch path 160 is reversely transported to the upstream side from the downstream side in the branch path 160 by the branch path roller pair 161 which reversely rotates.

The paper sheet P which is reversely transported from the branch path 160 is transported to the third supply path 143, and is transported toward the recording portion 110 by the plurality of transport roller pairs 131. The third supply path 143 detours the recording portion 110, and is converged with the first supply path 141 and the second supply path 142 further toward the upstream side than the recording portion 110. Therefore, as the paper sheet P is transported through the third supply path 143, the paper sheet P is reversed so that the other surface which is not printed opposes the recording portion 110, and is transported toward the recording portion 110 as a third driving roller pair 148 is driven to be rotated. In other words, the third supply path 143 functions as a reverse transport path which transports the paper sheet P while reversing the posture of the paper sheet P in the vertical direction Z.

Among the supply paths 141, 142, and 143, the second supply path 142 and the third supply path 143 transport the paper sheet P toward the recording portion 110 while making the posture of the paper sheet P curved in the vertical direction Z. Meanwhile, compared to the second supply path 142 and the third supply path 143, the first supply path 141 transports the paper sheet P toward the recording portion 110 without making the posture of the paper sheet P largely curved.

After the paper sheet P transported through each of the supply paths 141, 142, and 143 is transported to an aligning roller pair 149 installed further toward the upstream side than the recording portion 110 in the transport direction, a tip end thereof abuts against the aligning roller pair 149 which stopped rotating. In addition, inclination of the paper sheet P with respect to the transport direction is corrected (skew removing) by the state where the paper sheet P abuts against the aligning roller pair 149. After this, the paper sheet P of which the inclination is corrected is transported to the recording portion 110 in an aligned state as the aligning roller pair 149 is driven to be rotated.

The paper sheet P on which the recording is performed on one surface or on both surfaces by the recording portion 110 and the recording has been completed, is transported along the discharge path 150 which configures the downstream portion of the transport path 120 by the transport roller pair 131. The discharge path 150 branches to a first discharge path 151, the second discharge path 152, and a third discharge path 153 at a position which is further toward the downstream side than the position of branching from the branch path 160. In other words, the paper sheet P on which the recording has been completed is transported through a common discharge path 154 which configures the upstream portion of the discharge path 150. After this, the paper sheet P on which the recording has been completed is guided to any path among each of the first to the third discharge paths 151, 152, and 153 which configure the downstream portion of the discharge path 150, by a guiding mechanism 180 which is provided at a downstream end of the common discharge path 154.

The first discharge path 151 is provided to be oriented toward the upper part of the recording apparatus side housing 101, and to extend being curved along the branch path 160. The paper sheet P transported through the first discharge path 151 is discharged from a discharge port 155 which is open at a part of the recording apparatus side housing 101 to be a terminal end of the first discharge path 151. In addition, the paper sheet P discharged from the discharge port 155 falls to the lower side in the vertical direction Z, and is fed to a loading table 156 in a stacked state, as illustrated by two-dot chain line in FIG. 2. In addition, by the transport roller pairs 131 disposed at a plurality of locations of the discharge path 150, the paper sheet P is fed to the loading table 156 in a posture that the recording surface faces downward in the vertical direction Z when simplex printing is performed, from the discharge port 155.

The loading table 156 has a shape inclined to ascend upward, which rises to the upper side in the vertical direction Z when approaching in a rightward direction in the leftward-and-rightward direction X, and the paper sheets P are loaded in the stacked state on the loading table 156. At this time, each paper sheet P loaded on the loading table 156 moves in a leftward direction along the inclination of the loading table 156, and is loaded being close to a vertical side wall 157 provided on the lower side of the discharge port 155 of the recording apparatus side housing 101.

In addition, the first discharge path 151 includes a curved reverse path 151*a* which reverses front and rear surfaces of the paper sheet P while the paper sheet P on which the recording is performed by the recording portion 110 is transported to the discharge port 155. In other words, the curved reverse path 151*a* makes the paper sheet P curved by considering the recording surface of the paper sheet P on which the recording is performed by the recording portion 110 as an inner side, and reverses the paper sheet P from a state where the recording surface of the paper sheet P is oriented to the upper side in the vertical direction Z, in the vertical direction Z, to a state where the recording surface is oriented to the lower side in the vertical direction Z. Therefore, in the discharge path 150, the paper sheet P is discharged from the discharge port 155 in a state where the recording surface faces the loading table 156 when the simplex printing is performed as the paper sheet P passes through the curved reverse path 151*a*.

The second discharge path 152 branches further toward the lower side in the vertical direction Z than the first discharge path 151, and linearly extends toward the pull-out surface portion 106 which configures a part of the recording apparatus side housing 101 from the recording portion 110. Therefore, the paper sheet P transported through the second discharge path 152 is not transported in a curved posture similar to the first discharge path 151, is linearly transported while constantly maintaining the posture similar to the posture when the paper sheet P passes through the recording portion 110, and is discharged toward the upper surface portion 201*b* of the first housing 201 from the discharge port 108 formed in the pull-out surface portion 106. In other words, the second discharge path 152 functions as a non-reverse discharge path which transports the paper sheet P toward the upper surface portion 201*b* without reversing the posture of the paper sheet P in the vertical direction.

The third discharge path 153 branches further to the lower side than the second discharge path 152 in the vertical direction Z, and extends toward the lower side being inclined in the vertical direction Z so as to be oriented toward the lower part of the recording apparatus side housing 101. In addition, the downstream end is connected to the upstream end of a lead-in path 211 provided in the first post-processing apparatus 200 in the recording apparatus side housing 101. In other words, the paper sheet P transported through the third discharge path 153 is transported to the first post-processing apparatus 200. At this point, in the embodiment, the third discharge path 153 corresponds to an example of "first transport path in which the paper sheet P on which the image is recorded by the printer 100 is transported to the first post-processing apparatus 200". In addition, the second discharge path 152 corresponds to an example of "second transport path which branches from the third discharge path 153, and is positioned above the third discharge path 153".

A part of the discharge path 150 and a part of the branch path 160 are attached to the pull-out unit 170 provided in the recording apparatus side housing 101. The pull-out unit 170 is connected to the pull-out surface portion 106 and is capable of being integrally handled. Therefore, the pull-out unit 170 is pulled out from the recording apparatus side housing 101 by pulling out the pull-out surface portion 106, and is exposed from the recording apparatus side housing 101.

A first path forming portion 171 which configures a part of a guide surface on a curved inner side of the first discharge path 151 and a part of a guide surface on a curved outer side of the branch path 160, and a second path forming portion 172 which configures a part of the guide surface on the curved inner side of the branch path 160, are attached to the pull-out unit 170 to be rotatable around an axis 173 provided in the pull-out unit 170. In other words, in a state where the pull-out unit 170 is pulled out, as each of the path forming portions 171 and 172 rotates in a clockwise direction in FIG. 2 around the axis 173, the inner portions of the branch path 160 and the first discharge path 151 are exposed (refer to FIGS. 9 and 10).

Figure 3:
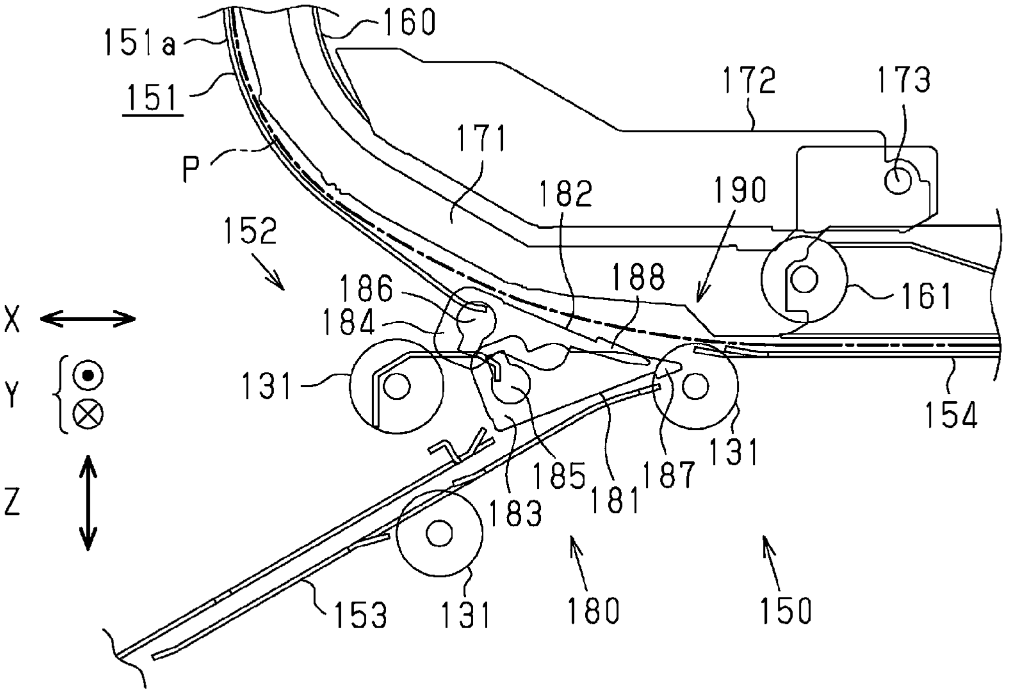
FIG. 3 is an enlarged view illustrating a first state of a guiding mechanism.
Figure 4:
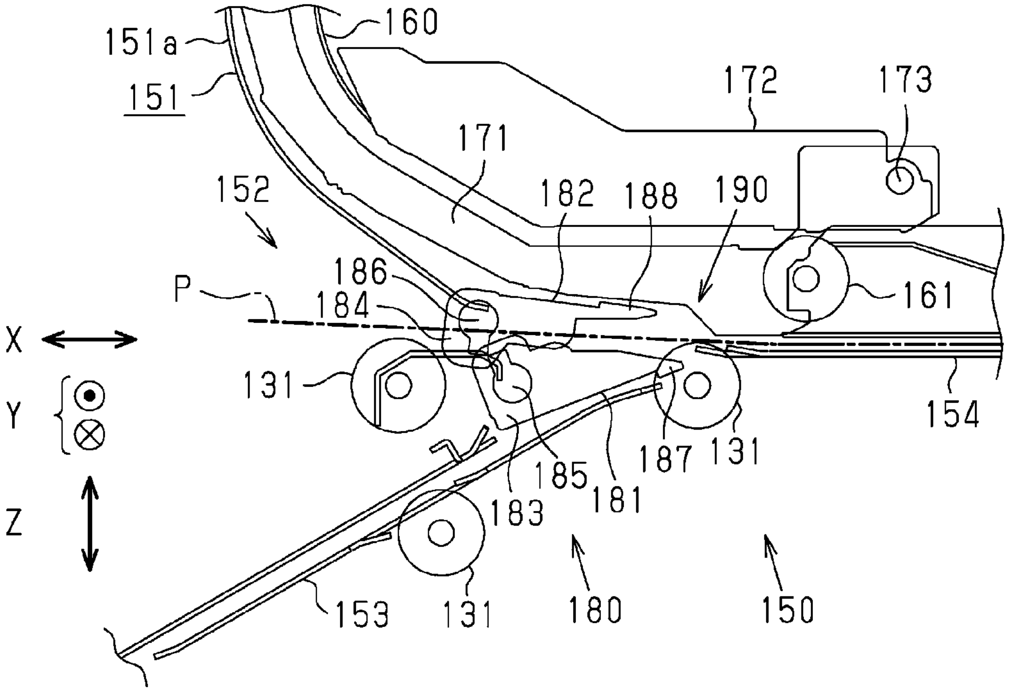
FIG. 4 is an enlarged view illustrating a second state of the guiding mechanism.
Figure 5:
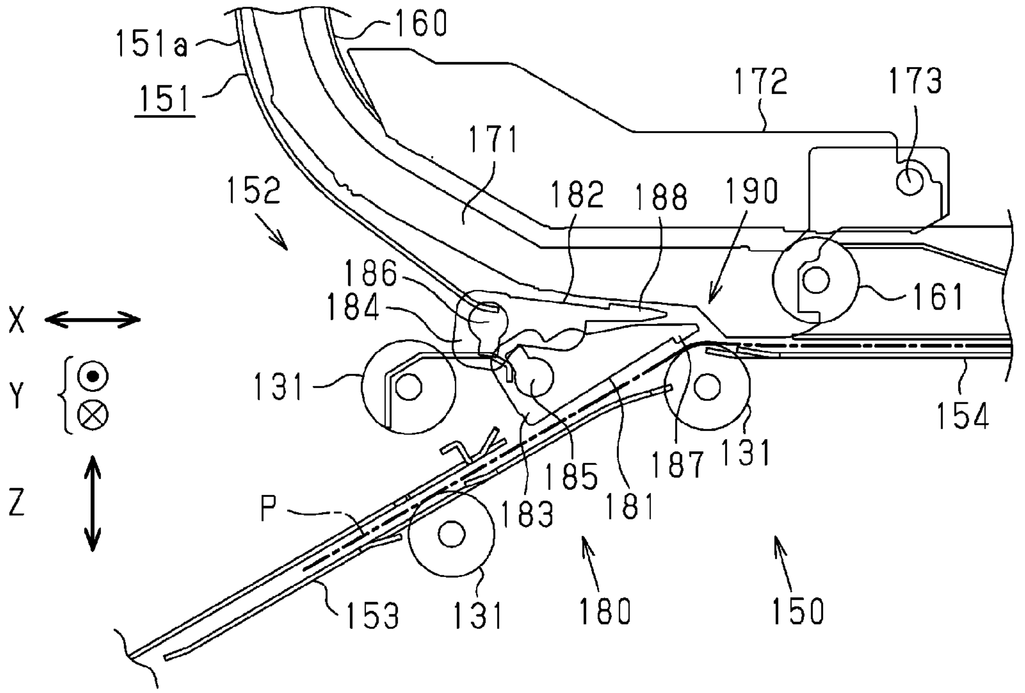
FIG. 5 is an enlarged view illustrating a third state of the guiding mechanism.

As illustrated in FIGS. 3 to 5, the guiding mechanism 180 includes a first guiding portion 181 and a second guiding portion 182. Each of the guiding portions 181 and 182 is provided at a branch position 190 which branches to each of the first to the third discharge paths 151, 152, and 153 from the downstream end of the common discharge path 154, and is disposed to be deviated in the leftward-and-rightward direction X which is the transport direction of the paper sheet P from the recording portion 110 so that the first guiding portion 181 is positioned on the right side which is the upstream side and the second guiding portion 182 is positioned on the left side which is the downstream side. In addition, even in the vertical direction Z, the guiding mechanism 180 is disposed to be deviated so that the first guiding portion 181 is positioned on the lower side and the second guiding portion 182 is positioned on the upper side.

In addition, each of the guiding portions 181 and 182 respectively includes axes 185 and 186 in base end portions 183 and 184 which are a part on the left side that becomes the downstream side in the leftward-and-rightward direction X which is the transport direction, and is provided to be rotatable around each of the axes 185 and 186. Each of the guiding portions 181 and 182 is a part on the right side which becomes the upstream side in the leftward-and-rightward direction X which becomes the transport direction as the guiding portions 181 and 182 rotate around the axes 185 and 186 which are respectively provided in the guiding portions, and positions of tip end portions 187 and 188 which are on a side opposite to the base end portions 183 and 184 are displaced up and down in the vertical direction Z. In other words, each of the guiding portions 181 and 182 is provided to be freely rotated between two positions, that is, an upper position at which each of the tip end portions 187 and 188 positioned on the upstream side in the transport direction of the paper sheet P is near the first path forming portion 171, and a lower position at which the tip end portions 187 and 188 are separated from the first path forming portion 171. Meanwhile, as illustrated in FIG. 3, the tip end portion 187 of the first guiding portion 181 is positioned further toward the upstream side than the tip end portion 188 of the second guiding portion 182 in the transport direction of the paper sheet P.

Each of the guiding portions 181 and 182 is respectively selectively switched up and down, comes into contact with the paper sheet P transported through the common discharge path 154, and accordingly, guides the paper sheet P to any of the first to the third discharge paths 151, 152, and 153. Meanwhile, each of the guiding portions 181 and 182 is configured not to interrupt the rotation operation each other, for example, not to interfere with each other since the guiding portions 181 and 182 are formed in a shape of comb teeth across the tip end portions 187 and 188 from the base end portions 183 and 184.

In addition, the rotation operations in each of the guiding portions 181 and 182 are controlled by a control portion which is provided in the printer 100 and is not illustrated.

FIG. 3 illustrates a state when both of the tip end portion 187 of the first guiding portion 181 and the tip end portion 188 of the second guiding portion 182 are positioned at the lower position. At this time, the tip end portion 187 of the first guiding portion 181 is positioned to block the upstream end of the third discharge path 153, and the tip end portion 188 of the second guiding portion 182 is positioned to block the upstream end of the second discharge path 152. Therefore, in the state of FIG. 3, the guiding mechanism 180 guides the paper sheet P transported through the common discharge path 154 to the first discharge path 151.

FIG. 4 illustrates a state when the tip end portion 187 of the first guiding portion 181 is positioned at the lower position, and the tip end portion 188 of the second guiding portion 182 is positioned at the upper position. At this time, the tip end portion 187 of the first guiding portion 181 is positioned to block the upstream end of the third discharge path 153, and the tip end portion 188 of the second guiding portion 182 is positioned to block the upstream end of the first discharge path 151. Therefore, in the state of FIG. 4, the guiding mechanism 180 guides the paper sheet P transported through the common discharge path 154 to the second discharge path 152.

FIG. 5 illustrates a state when both of the tip end portion 187 of the first guiding portion 181 and the tip end portion 188 of the second guiding portion 182 are positioned at the upper position. At this time, the tip end portion 187 of the first guiding portion 181 is positioned to block the upstream end of the first discharge path 151 and the upstream end of the second discharge path 152, and the tip end portion 188 of the second guiding portion 182 is positioned to block the upstream end of the first discharge path 151. Therefore, in the state of FIG. 5, the guiding mechanism 180 guides the paper sheet P transported through the common discharge path 154 to the third discharge path 153.

Next, the first post-processing apparatus 200 will be described.

As illustrated in FIG. 6, in the first housing 201 provided in the first post-processing apparatus 200, an intermediate transport portion 220 which transports the paper sheet P along an intermediate transport path 210 is provided. The intermediate transport path 210 is formed so that the paper sheet P is transported being curved by considering the direction which intersects the width direction of the medium and is a direction along the forward-and-rearward direction Y as the transport direction. In the intermediate transport path 210, the paper sheet P is transported to the second post-processing apparatus 300 from the first post-processing apparatus 200. At this point, in the embodiment, the intermediate transport path 210 corresponds to an example of "third transport path".

In the first post-processing apparatus 200, the length of the intermediate transport path 210 is set so that the time necessary for the paper sheet P transported at a predetermined transport speed to pass through the first post-processing apparatus 200, becomes the time necessary for drying the paper sheet P. In the embodiment, by performing switching of reversing and transporting the paper sheet P in the intermediate transport path 210, the length necessary for drying the paper sheet P is ensured. In addition, in the embodiment, the length becomes longer by meandering the intermediate transport path 210.

The intermediate transport portion 220 includes a plurality of intermediate transport roller pairs 221 provided along the intermediate transport path 210. In other words, as the intermediate transport roller pair 221 are driven to be rotated in a state of nipping and supporting the paper sheet P from the both front and rear sides, the paper sheet P is transported along the intermediate transport path 210. It is preferable that an unevenness be formed in an outer circumference so that the ink adhered to the paper sheet P is unlikely to move, in the intermediate transport roller pair 221.

The intermediate transport path 210 includes the lead-in path 211 which is connected to the downstream end of the third discharge path 153 provided in the printer 100, and leads the paper sheet P into the first housing 201. The lead-in path 211 is provided at the upper position in the vertical direction Z in the lead-in portion 202, and straightly extends in a diagonally downward orientation which intersects the vertical direction Z toward the inside of the first housing 201 which is the downstream side from the inside of the recording apparatus side housing 101 which is the upstream side in the transport direction. In other words, the lead-in path 211 is provided to penetrate a part of a side wall which configures a part of a side wall which configures the left side surface of the recording apparatus side housing 101 and the right side surface of the first housing 201. In addition, in the downstream portion which is positioned in the first housing 201 in the lead-in path 211, a sensor 222 which detects the paper sheet P transported through the lead-in path 211 is provided.

An upstream end of a first branch path 212 and an upstream end of the second branch path 213 are respectively connected to the downstream end of the lead-in path 211 which extends diagonally downward. The first branch path 212 branches leftward from the downstream end of the lead-in path 211, and extends to be curved to be swollen upward in the middle of the path. The second branch path 213 branches being curved further downward and to the right side from the downstream end of the lead-in path 211, and then, extends downward to meander. In other words, the intermediate transport path 210 branches to the first branch path 212 and the second branch path 213 from a branch point A which is the downstream end of the lead-in path 211. In addition, the paper sheet P transported through the lead-in path 211 is guided to any of the first branch path 212 and the second branch path 213 by the operation of a guide flap 223 provided at the branch point A. In addition, the guide flap 223 is driven based on a signal which is sent when the sensor 222 detects the paper sheet P, and the position at which the paper sheet P transported through the lead-in path 211 is guided to the first branch path 212 and the position at which the paper sheet P is guided to the second branch path 213 are switched to each other. In addition, it is preferable that the lengths in the transport direction of the first branch path 212 and the second branch path 213 be substantially the same as each other.

As illustrated in FIG. 6, an upstream end of a first switchback path 214 is connected to the downstream end of the first branch path 212. The first switchback path 214 extends downward after being slightly curved leftward in the leftward-and-rightward direction X from the middle of the path. In other words, the downstream end of the first switchback path 214 is positioned at the lowermost part in the first switchback path 214. In addition, the length of the first switchback path 214 in the transport direction is configured to be longer than the medium length of the paper sheet P on which the recording can be performed by the printer 100 in the transport direction.

In the first switchback path 214, the downstream portion which further toward the downstream side than the curved location is configured of a guide 214*a* which supports the paper sheet P transported being slightly curved rightward in the leftward-and-rightward direction X, from the lower side in the vertical direction Z. In addition, in the first switchback path 214, in the upstream portion which is further toward the upstream side than the curved location, one sensor 224 which detects the paper sheet P transported through the first switchback path 214, and two first reverse roller pairs 225 which can rotate in a normal rotation direction and in a reverse rotation direction, are provided. Two first reverse roller pairs 225 perform the normal rotation driving or the reverse rotation driving based on a signal which is sent when the sensor 224 detects the paper sheet P. In other words, the paper sheet P transported through the first switchback path 214 is transported (switched back) after the orientation in which the paper sheet P is transported is reversed by the first reverse roller pair 225.

In addition, while the movement of the paper sheet P to the first switchback path 214 from the first branch path 212 is allowed at the downstream end of the first branch path 212, a first regulation flap 226 which regulates the movement of the paper sheet P to the first branch path 212 from the first switchback path 214 is provided. The first regulation flap 226 is biased to block the downstream end of the first branch path 212 due to a biasing force by the biasing member which is not illustrated.

Meanwhile, an upstream end of a second switchback path 215 is connected to the downstream end of the second branch path 213. The second switchback path 215 is provided to extend downward in the vertical direction Z. In the second switchback path 215, the downstream end of the upstream portion including the curved location is open toward the right inner side surface of the first housing 201. At the position which opposes the downstream end, a guide portion 215*b* which extends being curved across the bottom surface 215*a* of the first housing 201 from the right inner side surface of the first housing 201 is provided. In other words, when the paper sheet P is transported through the second switchback path 215, the tip end of the paper sheet P protrudes from the opening downstream end, the protruding tip end of the paper sheet P is guided by the guide portion 215*b*, and the tip end of the paper sheet P is led to dive into the bottom surface 215*a* of the first housing 201 and the lower part of the downstream end of the first switchback path 214.

In other words, the second switchback path 215 is configured to include the guide portion 215*b* and the bottom surface 215*a* of the first housing 201. In addition, similar to the first switchback path 214, the length of the second switchback path 215 in the transport direction is configured to be equal to or longer than the medium length in the transport direction of the paper sheet P on which the recording can be performed by the printer 100 in the transport direction. It is needless to say that the downstream portion of the second switchback path 215 configured of the guide portion 215*b* and the bottom surface 215*a* of the first housing 201, may be configured to be similar to the upstream portion, or may be configured only of the guide portion 215*b*.

In addition, in the upstream portion of the second switchback path 215, at the position which is further toward the upstream side than the curved location, one sensor 227 which detects the paper sheet P transported through the second switchback path 215, and one second reverse roller pair 228 which can rotate in the normal rotation direction and in the reverse rotation direction, are provided. In addition, one more second reverse roller pair 228 is provided at a position which is further toward the downstream side than the curved location in the upstream portion of the second switchback path 215. Two second reverse roller pairs 228 perform the normal rotation driving or the reverse rotation driving based on the signal which is sent from the sensor 227. In other words, the paper sheet P transported through the second switchback path 215 is transported (switched back) after the orientation in which the paper sheet P is transported is reversed by the second reverse roller pair 228.

In addition, while the movement of the paper sheet P to the second switchback path 215 from the second branch path 213 is allowed at the downstream end of the second branch path 213, a second regulation flap 229 which regulates the movement of the paper sheet P to the second branch path 213 from the second switchback path 215 is provided. The second regulation flap 229 is biased to block the downstream end of the second branch path 213 due to the biasing force by the biasing member which is not illustrated.

An upstream end of a first joining path 216 is connected to the upstream end of the first switchback path 214. In other words, the first joining path 216 extends downward being curved rightward in the leftward-and-rightward direction X from a first connection point B at which the downstream end of the first branch path 212 and the upstream end of the first switchback path 214 are connected to each other. In addition, an upstream end of a second joining path 217 is connected to the upstream end of the second switchback path 215. In other words, the second joining path 217 extends being curved leftward in the leftward-and-rightward direction X from a second connection point C at which the downstream end of the second branch path 213 and the upstream end of the second switchback path 215 are connected to each other. In addition, the first joining path 216 and the second joining path 217 join with each other at a joining point D which is positioned between the first switchback path 214 and the second switchback path 215.

In other words, when the paper sheet P is transported from the first branch path 212 to the first switchback path 214, the first regulation flap 226 is displaced to open the downstream end of the first branch path 212 as the tip end of the paper sheet P comes into contact with the first regulation flap 226. Meanwhile, when the paper sheet P is reversely transported (switched back) from the first switchback path 214, the paper sheet P is regulated not to be transported to the first branch path 212 by the first regulation flap 226, and the paper sheet P is guided to the first joining path 216. In addition, when the paper sheet P is transported to the second switchback path 215 from the second branch path 213, the second regulation flap 229 is displaced to open the downstream end of the second branch path 213 as the tip end of the paper sheet P comes into contact with the second regulation flap 229. Meanwhile, when the paper sheet P is reversely transported (switched back) from the second switchback path 215, the paper sheet P is regulated not to be transported to the second branch path 213 by the second regulation flap 229, and the paper sheet P is guided to the second joining path 217.

In addition, it is preferable that the lengths of the first joining path 216 and the second joining path 217 become substantially the same as each other.

In addition, an upstream end of a lead-out path 218 is connected to the joining point D at which the downstream end of the first joining path 216 and the downstream end of the second joining path 217 are connected to each other. The lead-out path 218 detours to go around the lower side of the downstream end of the first switchback path 214, and extends to an upper portion of the lead-out portion 203, after extending downward being curved to pass through between the first switchback path 214 and the second switchback path 215 toward the second post-processing apparatus 300.

The downstream end of the lead-out path 218 penetrates a part of the side wall on the left side in the first housing 201, and extends toward the second post-processing apparatus 300. In the intermediate transport roller pair 221 provided in the lead-out path 218, that is, in the intermediate transport roller pair 221 which opposes the first switchback path 214, a cover 221*a* is provided on the first switchback path 214 side. Accordingly, the paper sheet P transported through the first switchback path 214 is prevented from coming into contact with the intermediate transport roller pair 221 of the lead-out path 218.

The lead-out path 218 includes a linking path 219 which is disposed on the inside of the extending portion 203*a*, and is linked to the second post-processing apparatus 300. The linking path 219 includes a first part 219*a* which is curved on the printer 100 side above the recess portion 203*b*, and a second part 219*b* which is curved on the second post-processing apparatus 300 side further toward the downstream side than and above the first part 219*a*. The downstream end of the second part 219*b* is connected to the transport path (not illustrated) in the second post-processing apparatus 300. A part of the upper surface portion 201*b* is disposed below the first part 219*a*.

In this manner, the intermediate transport path 210 includes the lead-in path 211, the first branch path 212, the second branch path 213, the first switchback path 214, the second switchback path 215, the first joining path 216, the second joining path 217, and the lead-out path 218. In addition, in the positional relationship of each of the points A, B, C, and D, the points are disposed in order of "A, B, D, C" from above in the vertical direction Z, and are disposed in order of "C, A, D, B" from right in the leftward-and-rightward direction X.

Next, a work method when eliminating a transport failure of the paper sheet P in the printing system 1000 will be described.

Similar to the printer 100 illustrated in FIG. 2, the recording is performed on the sheet-like medium, such as the paper sheet P, and in the recording apparatus which transports the medium, there is a case where the transport failure, such as paper jamming, occurs while transporting the paper sheet P along the path. In particular, in the recording apparatus which performs the recording by dispensing the liquid, such as the ink, onto the medium, the recording surface of the paper sheet P expands, and curl which makes the recording surface be in a convex shape is likely to be generated. Therefore, the transport failure is likely to occur further toward the downstream side than the recording portion 110. Here, in the printer 100 of the embodiment, in order to make it easy to take out the paper sheet P which is jammed while being transported, a part of the intermediate transport path 210 is configured to be openable. In addition, a part of the discharge path 150 and a part of the branch path 160 can be pulled out from the recording apparatus side housing 101.

As illustrated in FIGS. 7 and 8, as the upper surface portion 201*b* in the first positional state (refer to FIG. 7) rotates with respect to the main body portion 201*a* on one end side in the forward-and-backward direction Y, the upper surface portion 201*b* is switched to be in the second positional state (refer to FIG. 8). The upper surface portion 201*b* in the second positional state can open the upwardly opening portion of the first housing 201. Therefore, the first post-processing apparatus 200 on the inside of the first housing 201, and specifically, the intermediate transport path 210, are exposed. Therefore, it is possible to remove the paper sheet P which is in the intermediate transport path 210.

Figure 9:
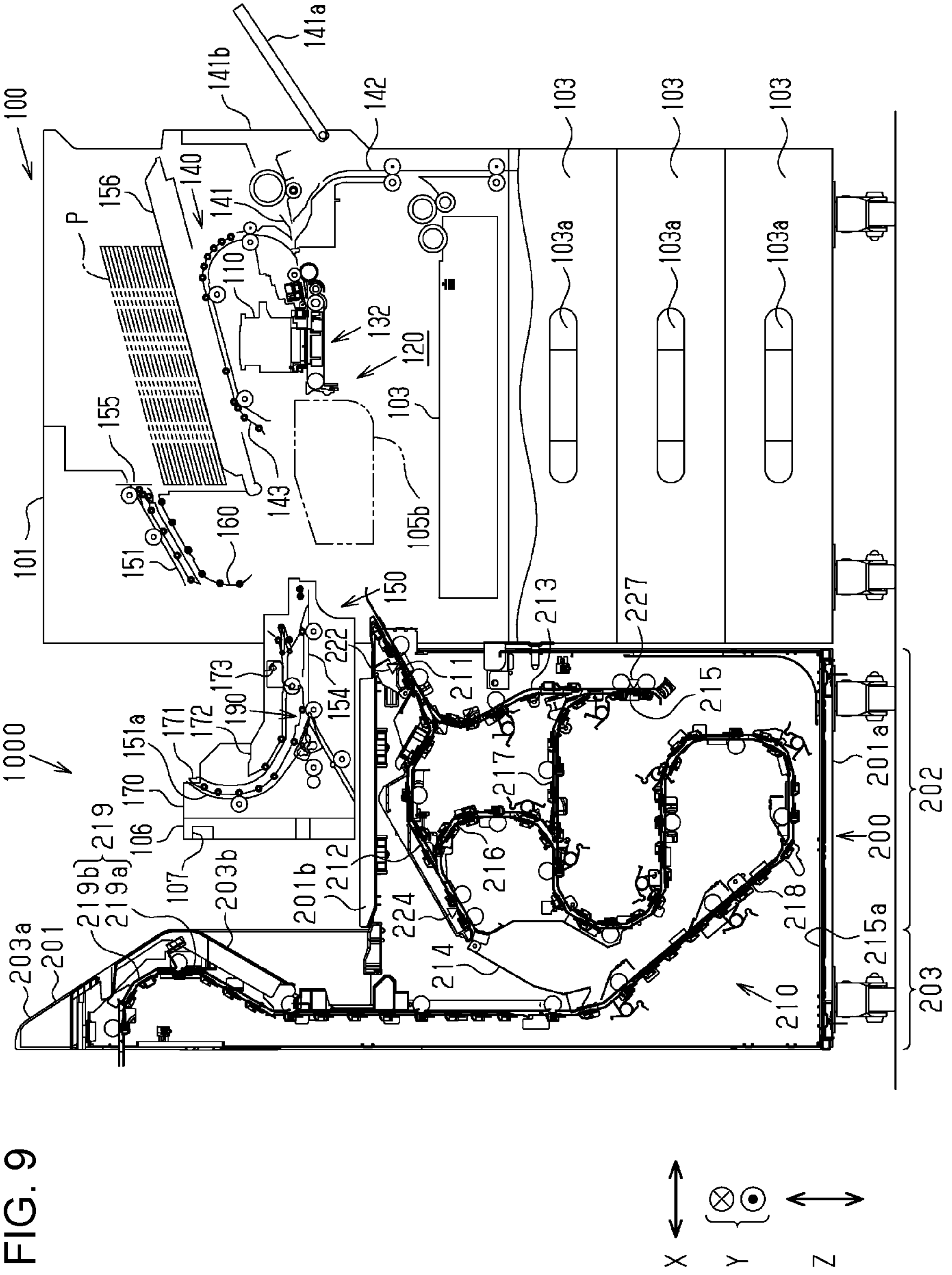
FIG. 9 is a schematic structure view illustrating a part of the recording system in a state where a pull-out unit is pulled out.

As illustrated in FIG. 9, when the paper jamming of the paper sheet P occurs in the discharge path 150 and the branch path 160, the user hooks the hand to the handle portion 107 formed in the pull-out surface portion 106, and pulls out the pull-out surface portion 106 along the pulling-out direction which is the leftward direction in the leftward-and-rightward direction X that is the transport direction of the paper sheet P. When the pull-out surface portion 106 is pulled out along the pulling-out direction, the pull-out unit 170 is pulled out from the recording apparatus side housing 101 together with the pull-out surface portion 106. In other words, the curved reverse path 151*a*, the second discharge path 152, and the third discharge path 153, which configure the discharge path 150, and a part of the branch path 160, are pulled out. Furthermore, the guiding mechanism 180 provided at the branch position 190 which is the downstream end of the common discharge path 154 is also pulled out to the outside of the recording apparatus side housing 101.

At this time, since the height of the upper surface portion 201*b* which covers the upper part of the first post-processing apparatus 200 attached to the left side of the printer 100 is formed to be lower than the lower portion of the pull-out surface portion 106, the upper surface portion 201*b* does not interfere with the pull-out surface portion 106 and the pull-out unit 170 when the pull-out unit 170 is pulled out. In other words, the printer 100 is configured to be capable of pulling out the second discharge path 152 and the third discharge path 153 further upward than the upper surface portion 201*b* of the first post-processing apparatus 200. In addition, the length of the lead-in portion 202 in the leftward-and-rightward direction X is formed to be longer than the length by which the pull-out unit 170 is pulled out from a region (moving region) in which the pull-out unit 170 moves in the leftward-and-rightward direction X, that is, the pull-out unit 170 is pulled out from the recording apparatus side housing 101. Therefore, the lead-out portion 203 formed to be higher than the lead-in portion 202 does not interfere with the pull-out surface portion 106 and the pull-out unit 170 when the pull-out unit 170 is pulled out. In other words, the first post-processing apparatus 200 is formed to avoid the moving region when the pull-out unit 170 is pulled out from the recording apparatus side housing 101. In addition, if the pull-out unit 170 can be pulled out in the direction which intersects the transport direction of the paper sheet P, when pulling out the pull-out unit 170, there is a concern that the jammed paper sheet P is torn off in the path. Therefore, it is preferable that the pull-out unit 170 can be pulled out in the direction along the transport direction of the paper sheet P.

Figure 10:
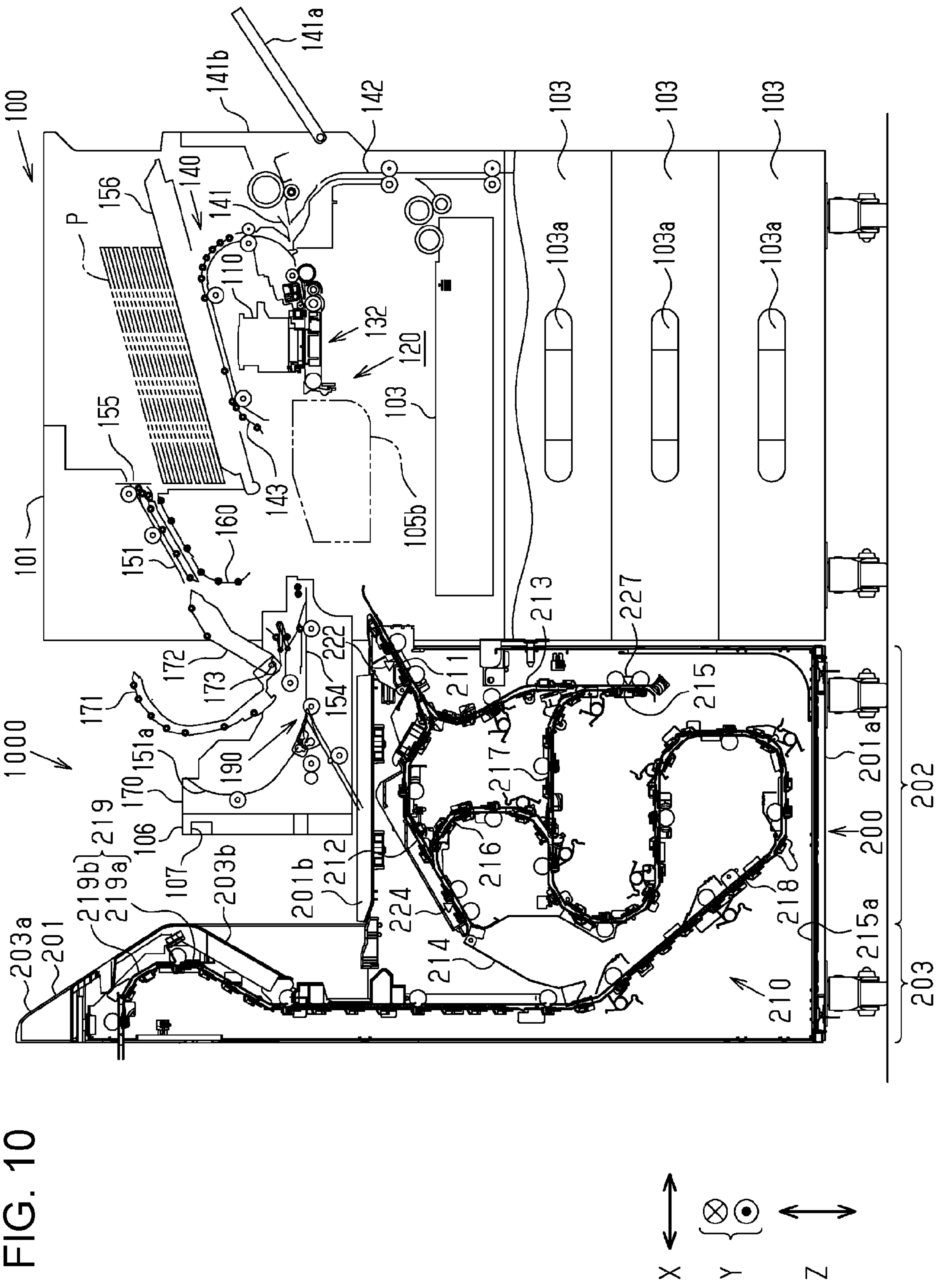
FIG. 10 is a schematic structure view illustrating a part of the recording system when a path forming portion rotates in a state where the pull-out unit is pulled out.

As illustrated in FIG. 10, after pulling out the pull-out unit 170 from the recording apparatus side housing 101, the first path forming portion 171 and the second path forming portion 172 which are attached to the pull-out unit 170 are rotated in the clockwise direction around the axis 173. Then, the guide surface on the inner side of the curved reverse path 151*a* which configures the first discharge path 151 is separated from the guide surface on the outer side, and the guide surface on the outer side of the branch path 160 is separated from the guide surface on the inner side. As the guide surfaces on the outer sides and the guide surfaces on the inner sides of the curved reverse path 151*a* and the branch path 160 are respectively separated from each other, the inside of the path is open, and the paper sheet P jammed in the path can be taken out. In addition, when pulling out the pull-out unit 170, there is a case where the paper sheet P remains not in the pull-out unit 170, but in the recording apparatus side housing 101. In this case, by opening the front plate cover 104 (refer to FIG. 1), the opening portion 105*b* is exposed. Therefore, the paper sheet P is extracted via the opening portion 105*b*, and the transport failure is eliminated.

Next, the first post-processing performed by the first post-processing apparatus 200 will be described.

In a case where the second post-processing is performed with respect to the paper sheet P on which the recording is performed by the recording portion 110 included in the printer 100, the paper sheet P is transported to the second post-processing apparatus 300 via the first post-processing apparatus 200 without being discharged onto the loading table 156 via the first discharge path 151.

In other words, the paper sheet P on which the recording has been completed is guided to the third discharge path 153 from the common discharge path 154 by the branch mechanism 147, and is led into the lead-in path 211 in the recording apparatus side housing 101.

Figure 11:
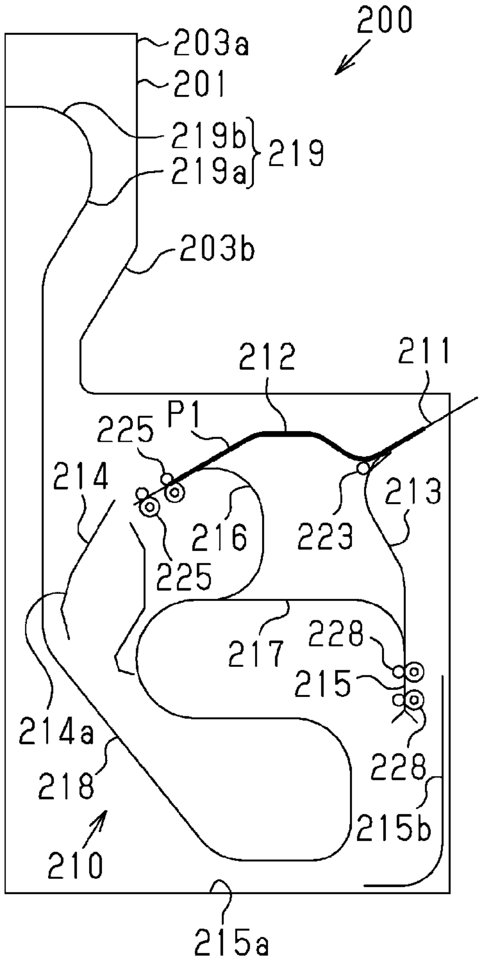
FIG. 11 is a view illustrating a first state when a medium is transported in the first post-processing apparatus.

As illustrated in FIG. 11, a first paper sheet P1 which is led into the first housing 201 is transported to the downstream side along the lead-in path 211. In addition, as the guide flap 223 provided at the downstream end of the lead-in path 211 is positioned to block the upstream end of the second branch path 213, the paper sheet P1 is guided to the first branch path 212. Next, when the paper sheet P1 passes through the lead-in path 211, a second paper sheet P2 is led into the lead-in path 211.

Figure 12:
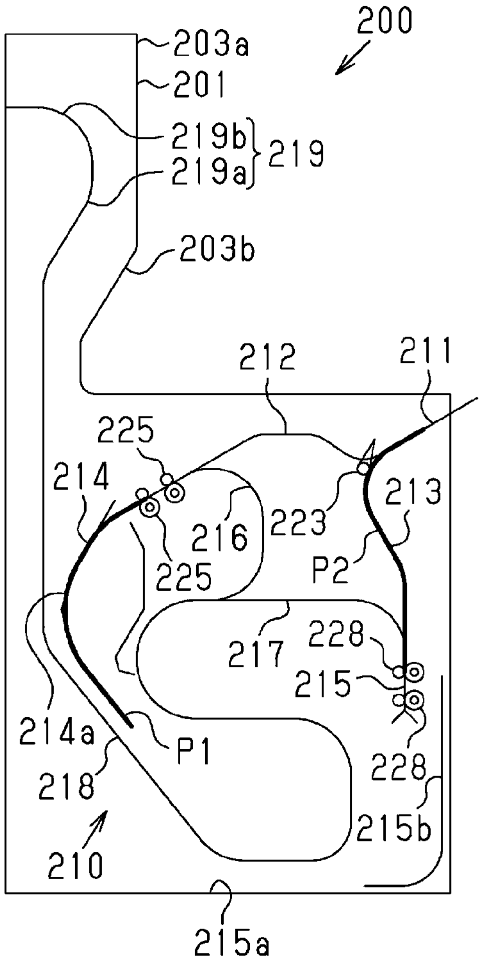
FIG. 12 is a view illustrating a second state when the medium is transported in the first post-processing apparatus.

As illustrated in FIG. 12, the paper sheet P1 transported through the first branch path 212 is transported to the first switchback path 214 by the first reverse roller pair 225 which is driven to be normally rotated. Meanwhile, as the guide flap 223 is positioned to block the upstream end of the first branch path 212, the paper sheet P2 transported through the lead-in path 211 is guided to the second branch path 213. The paper sheet P2 transported to the second branch path 213 is transported to the second switchback path 215 by the second reverse roller pair 228 which is driven to be normally rotated. Next, when the paper sheet P2 passes through the lead-in path 211, a third paper sheet P3 is led into the lead-in path 211.

Figure 13:
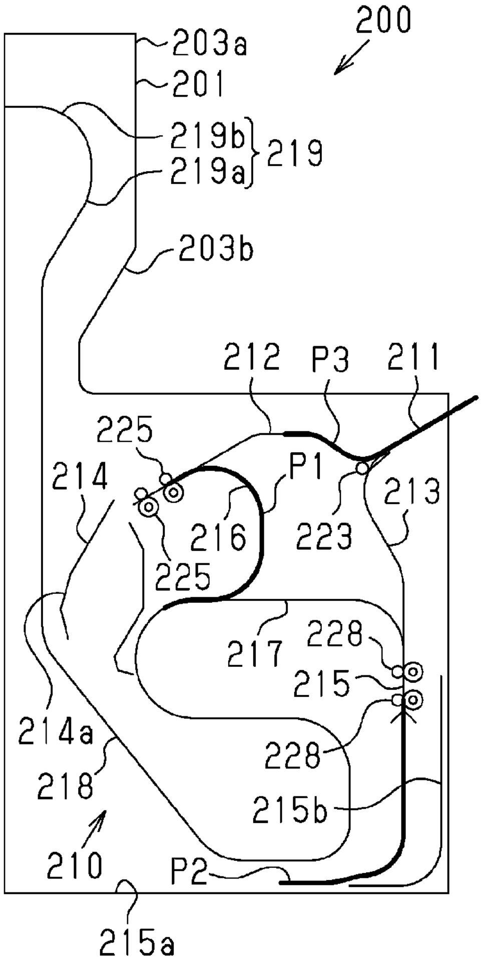
FIG. 13 is a view illustrating a third state when the medium is transported in the first post-processing apparatus.

As illustrated in FIG. 13, the paper sheet P1 which is transported to the downstream side through the first switchback path 214, and is stored in the first switchback path 214, is transported toward the upstream side from the downstream side of the first switchback path 214 by the first reverse roller pair 225 which is driven to be reversely rotated, and is transported to the lead-out path 218 through the first joining path 216. Meanwhile, the tip end of the paper sheet P2 transported through the second switchback path 215 protrudes from the opening downstream end of the second switchback path 215, and is led to the bottom surface 215*a* of the first housing 201 along the guide portion 215*b*. In addition, there is also a case where the paper sheet P2 is not led to the bottom surface 215*a* of the first housing 201 due to the medium length of the paper sheet P transported through the second switchback path 215 in the transport direction. In addition, the paper sheet P3 transported through the lead-in path 211 is guided to the first branch path 212 by the guide flap 223. Next, when the paper sheet P3 passes through the lead-in path 211, a fourth paper sheet P4 is led into the lead-in path.

Figure 14:
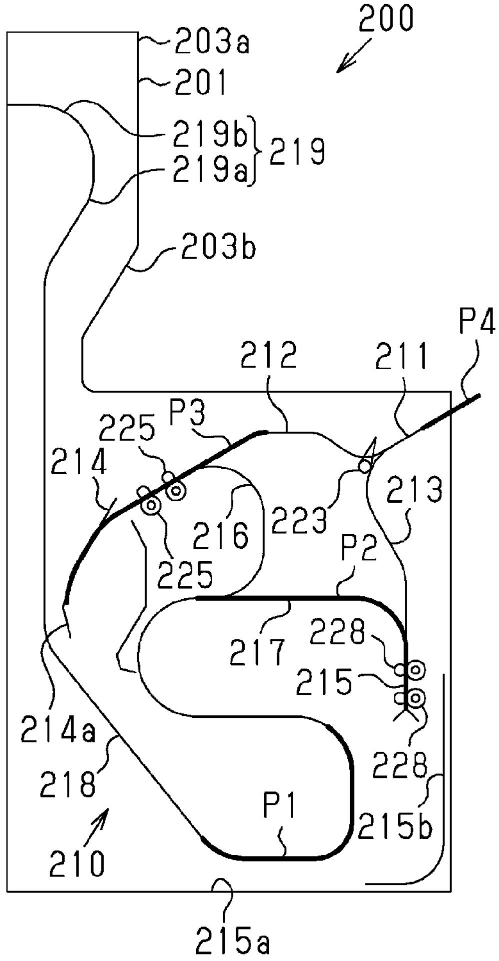
FIG. 14 is a view illustrating a fourth state when the medium is transported in the first post-processing apparatus.

As illustrated in FIG. 14, the paper sheet P2 stored in the second switchback path 215 is transported toward the upstream side from the downstream side of the second switchback path 215 by the second reverse roller pair 228 which is driven to be reversely rotated, and is transported to the lead-out path 218 through the second joining path 217. Meanwhile, the paper sheet P3 transported through the first branch path 212 is transported to the first switchback path 214.

Figure 15:
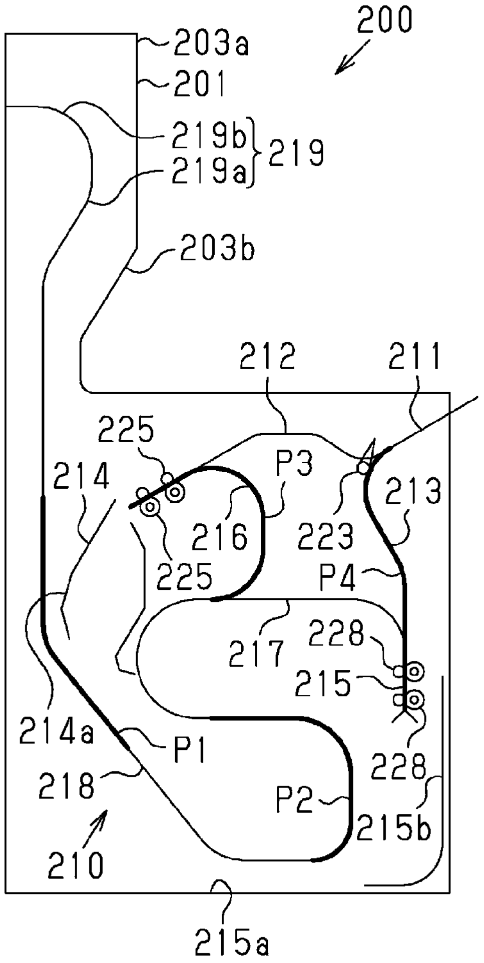
FIG. 15 is a view illustrating a fifth state when the medium is transported in the first post-processing apparatus.

As illustrated in FIG. 15, the paper sheet P3 transported through the first switchback path 214 is transported to the lead-out path 218 through the first joining path 216 by the first reverse roller pair 225. Meanwhile, the paper sheet P4 transported through the lead-in path 211 is guided to the second branch path 213 by the guide flap 223, and is transported to the second switchback path 215.

In other words, each of the paper sheets P1, P2, P3, and P4 which are transported through the lead-in path 211 one after another, is alternately guided to the first branch path 212 and the second branch path 213 by the guide flap 223. For example, in a case where the first paper sheet P1 is guided to the second branch path 213, the second paper sheet P2 is transported to the first branch path 212.

In this manner, the posture of the paper sheet P on which the recording is performed by the printer 100 is reversed by the first post-processing apparatus 200, and the paper sheet P is transported to the second post-processing apparatus 300 in a state where the recording surface is oriented to the lower side in the vertical direction Z when the simplex printing is performed. In addition, at this time, since it is not preferable that the paper sheet P be transported to the second post-processing apparatus 300 in a state where the curl is generated in the paper sheet P, the length of the intermediate transport path 210 in the first housing 201 is ensured in the transport direction of the paper sheet P by making the path be curved and extend to meander.

Here, it is known that the curl of the paper sheet P generated as the ink adheres to the recording head 111 provided in the recording portion 110, is gradually settled as time elapses. Therefore, by ensuring the length of the intermediate transport path 210, the first post-processing apparatus 200 ensures time which is required until the degree of the curl generated in the paper sheet P becomes equal to or less than a predetermined degree, as time which is required for transporting the paper sheet P through the intermediate transport path 210. After this, the second post-processing apparatus 300 performs the second post-processing, such as cutting or stapling, with respect to the paper sheet P.

In particular, since the printing is performed at a high speed onto the paper sheet P by the line head type recording head 111, and the transporting is performed at a high speed, there is a possibility that the paper sheet P is transported without being sufficiently dried. In other words, there is a concern that the paper sheet P is transported to the second post-processing apparatus 300 in a state where the curl is not sufficiently settled, and the post-processing cannot be correctly performed. However, when the transport speed is decreased in the intermediate transport path 210 for ensuring the drying time, the entire throughput decreases since the paper sheet transported at a high speed when the recording is performed is separated from the paper sheet which previously transported through the intermediate transport path 210 not to collide with the previous paper sheet. In particular, there is a possibility that the following paper sheet collides with the previous paper sheet in the middle of the post-processing with respect to the previous paper sheet.

Here, in the first post-processing apparatus 200, as the plurality of switchback paths, such as the above-described first switchback path 214 and the second switchback path 215 are provided, it is possible to ensure the length of the intermediate transport path 210 and provide the drying time while suppressing an increase in the size of the inside of the first post-processing apparatus 200. In addition, it is possible to perform the recording on the paper sheet without both unnecessary increase in the distance between the paper sheets, and deterioration of the throughput. In addition, as described above, by using the shape of the path which is curved and extend to meander as the intermediate transport path 210, it is possible to further gain the drying time.

Next, an action of the upper surface portion 201*b* of the printing system 1000 will be described.

As illustrated in FIG. 2, in the printer 100, when the recording is performed on the paper sheet P, the recording is performed with respect to any one of the paper sheet P accommodated in the paper cassette 103, and the paper sheet P which is inserted from the insertion port 141*b*. At this time, when the recording is performed with respect to a medium which cannot be accommodated in the paper cassette 103, and particularly, a medium which has a large amount of rigidity, such as a thick paper sheet, the thick paper sheet is inserted from the insertion port 141*b*, and is transported to the recording portion 110 through the first supply path 141. Since the medium, such as the thick paper sheet, is unlikely to be curved due to a large amount of rigidity, there is a case where the transport failure, such as paper jamming, occurs when being transported through the transport path 120 having a high degree of curve. Therefore, the first supply path 141 is a linear path which has a small degree of curve compared to that of the second supply path 142, and straightly extends toward the recording portion 110.

The thick paper sheet on which the recording is performed by the recording portion 110 is transported to any of the first discharge path 151, the second discharge path 152, and the third discharge path 153 which configure the discharge path 150. Here, when loading the thick paper sheet on which the recording has been completed on the loading table 156, the thick paper sheet is transported through the first discharge path 151. However, since the first discharge path 151 includes the curved reverse path 151*a* which is largely curved, when the thick paper sheet is transported, there is a concern that the transport failure occurs. In addition, when the thick paper sheet is loaded on the paper discharge portion 302 provided in the second post-processing apparatus 300 via the first post-processing apparatus 200 from the third discharge path 153, since it becomes necessary to provide a path which has a small degree of curve in the first post-processing apparatus 200, there is a concern that the degree of freedom of design of the intermediate transport path 210 provided in the first post-processing apparatus 200 deteriorates.

Here, the printer 100 of the embodiment is provided with the second discharge path 152 which is formed to straightly extend along the common discharge path 154. In other words, the thick paper sheet which passes through the recording portion 110 from the second supply path 142 and is transported through the common discharge path 154 and the second discharge path 152, is transported in a state where one surface which is the upper side in the vertical direction Z is always oriented to the upper side when being inserted into the insertion port 141*b*. In addition, while maintaining the state where the one surface which is the recording surface is oriented to the upper side, the thick paper sheet is discharged from the discharge port 108.

The paper sheet P discharged from the third discharge path 153 is discharged toward the upper part of the upper surface portion 201*b* positioned below the third discharge path 153. The paper sheet P abuts against the surface on the printer 100 side of the recess portion 203*b* by the biasing when being discharged from the discharge port 108, and is dropped onto the upper surface portion 201*b*. In other words, the upper surface portion 201*b* functions as a paper discharge tray. Therefore, compared to a case where a paper discharge tray which is additional to the first housing 201 is provided in the vicinity of the discharge port 108, it is possible to contribute to making the size of the printing system 1000 small. In addition, it is preferable that a biasing force which is applied to the paper sheet P discharged from the third discharge path 153 of the printer 100 be a degree by which a paper sheet P having a small size abuts against the recess portion 203*b*.

In addition, for example, in a case where a paper discharge tray additional to the housing 201 is provided in the vicinity of the discharge port 108, when pulling out the pull-out unit 170, the pull-out unit 170 is pulled out when the paper discharge tray is taken out, and the operation becomes complicated. Meanwhile, in the embodiment, since the upper surface portion 201*b* functions as the paper discharge tray, it is possible to easily perform a pulling-out operation of the pull-out unit 170.

According to the above-described embodiment, the following effects can be achieved.

(1) Since the printing system 1000 functions as the paper discharge tray in which the paper sheet P is mounted on the upper surface portion 201*b* of the first housing 201, compared to a configuration in which the paper discharge tray protrudes from the side of the printer 100, it is possible to contribute to making the size of the printing system 1000 small.

(2) In the printing system 1000, since the second plate-like member 201*d* which is a part of the upper surface portion 201*b* is disposed on the inside of the recess portion 203*b*, compared to a case where the recess portion 203*b* is not formed, it is possible to increase an area of the upper surface portion 201*b*. Therefore, the paper sheet P having a large size can also be appropriately mounted on the upper surface portion 201*b*.

In addition, compared to a case where the recess portion 203*b* and the second plate-like member 201*d* which is disposed on the inside of the recess portion 203*b* are not provided, and compared to a case of corresponding to the paper sheet P having a large size simply by enlarging the first plate-like member 201*c*, it is possible to suppress an increase in size of the first post-processing apparatus 200 in the leftward-and-rightward direction X.

(3) For example, in a case where the linking path 219 is bent in the horizontal direction after extending upward from below, and is oriented toward the second post-processing apparatus 300, the bending angle becomes a substantially right angle, and the curvature increases. In addition, as the curvature of the path increases, a transport failure of the paper sheet P is likely to be generated in the linking path 219.

In the embodiment, since the linking path 219 disposed on the inside of the extending portion 203*a* is curved on the printer 100 side, it is possible to reduce the curvature of the linking path 219. Therefore, a transport failure of the paper sheet P is unlikely to be generated. In addition, by making the linking path 219 curved, since it is possible to elongate the entire length of the intermediate transport path 210, it is possible to reduce a concern that the paper sheet P is transported to the second post-processing apparatus 300 in a state of not being sufficiently dried.

In addition, since the part which is further toward the upstream side than the first part 219*a* in the linking path 219 is close to the second post-processing apparatus 300 side, it is possible to form the recess portion 203*b* to be large. Therefore, it is possible to suppress an increase in size of the first post-processing apparatus 200 in the leftward-and-rightward direction X.

(4) In the printing system 1000, since it is possible to expose the upper part of the first post-processing apparatus 200 by switching the positional state of the upper surface portion 201*b*, when eliminating the transport failure of the paper sheet P on the inside of the first post-processing apparatus 200, it is possible to easily remove the paper sheet P having a transport failure from the inside of the first post-processing apparatus 200.

(5) When eliminating the transport failure of the paper sheet P of the second discharge path 152 and the third discharge path 153, the printing system 1000 can easily remove the paper sheet P by pulling out the second discharge path 152 and the third discharge path 153 to upper part of the upper surface portion 201*b*.

(6) The printing system 1000 can make the paper sheet P abut against the surface on the printer 100 side of the recess portion 203*b* by a biasing force when discharging the paper sheet P from the discharge port 108. Therefore, since the end portions of the paper sheet P are likely to be arranged, usability of the user is improved.

In addition, the above-described embodiment may be changed as follows.

In the above-described embodiment, at the location illustrated by a dotted line of FIG. 6, an opening portion 230 through which the user can insert the hand may be formed. In this configuration, when the transport failure, such as paper jamming, occurs in the first post-processing apparatus 200, it is possible to eliminate the transport failure by opening an opening/closing cover which configures the external appearance of the first post-processing apparatus 200, by inserting the hand from the opening portion 230 provided on the side wall which forms the intermediate transport path 210, and by pulling out the jammed paper sheet P.

In the above-described embodiment, the printing system 1000 may be configured to include the printer 100 in the first housing 201. In other words, the first housing 201 is integrated with the recording apparatus side housing 101, the first housing 201 covers the printer 100 together with the first post-processing apparatus 200. Therefore, it is possible to make the housing of the first post-processing apparatus 200 and the housing of the printer 100 common. In this case, the printer 100 and the first post-processing apparatus 200 may be configured to be integrated with each other.

In the above-described embodiment, the printing system 1000 may be configured to include the second post-processing apparatus 300 in the first housing 201. In other words, the first housing 201 is integrated with the second housing 301, and the first housing 201 covers the second post-processing apparatus 300 together with the first post-processing apparatus 200. Therefore, it is possible to make the housing of the first post-processing apparatus 200 and the housing of the second post-processing apparatus 300 common. In this case, the first post-processing apparatus 200 and the second post-processing apparatus 300 may be configured to be integrated with each other.

In the above-described embodiment, the printing system 1000 may be configured to include the first post-processing apparatus 200 and the second post-processing apparatus 300 in the first housing 201. In other words, the first housing 201 is integrated with the recording apparatus side housing 101 and the second housing 301, and the first housing 201 covers the printer 100 and the second post-processing apparatus 300 together with the first post-processing apparatus 200. In this case, the printer 100, the first post-processing apparatus 200, and the second post-processing apparatus 300 may be configured to be integrated with each other.

Figure 16:
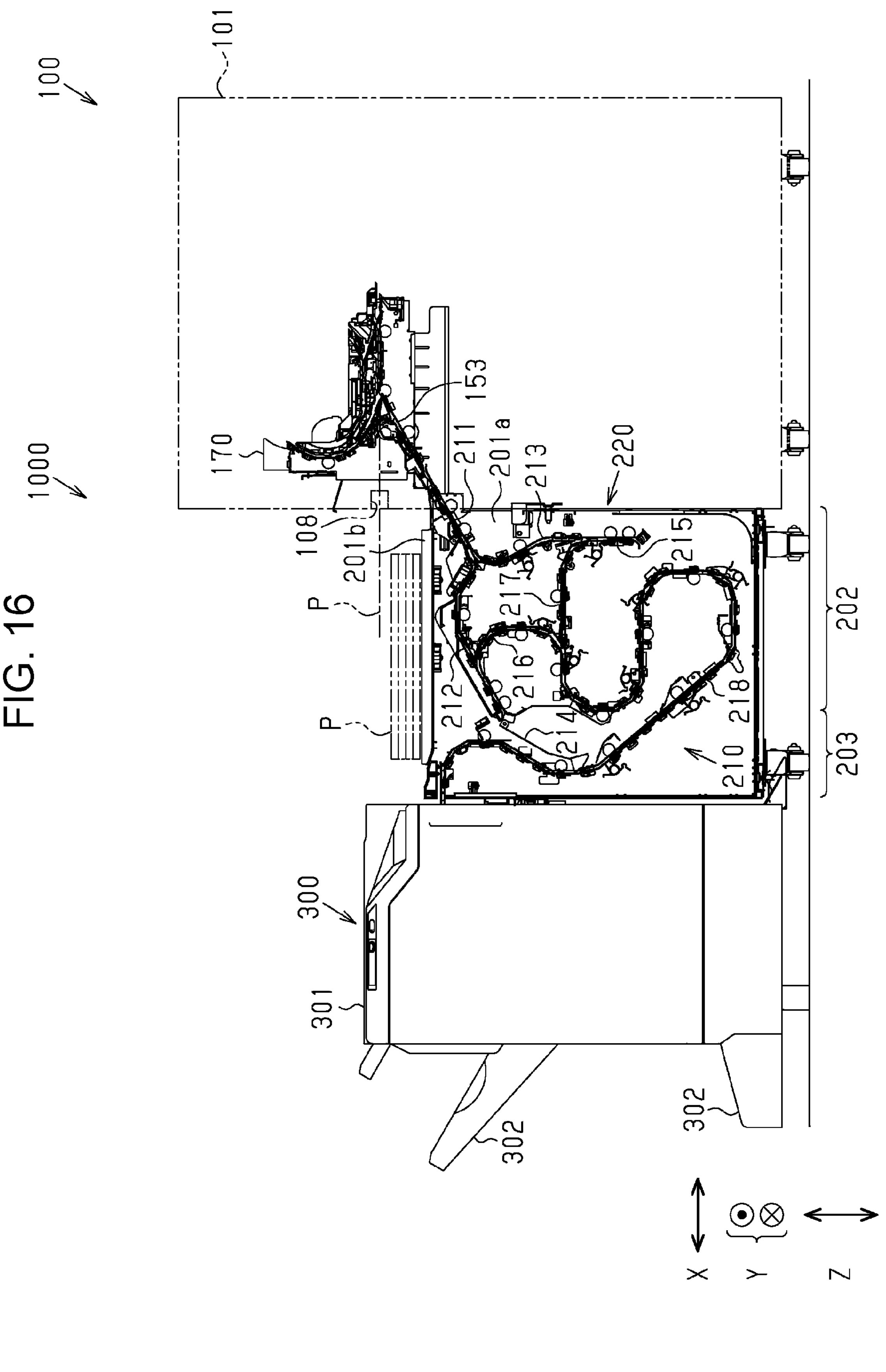
FIG. 16 is a view illustrating a modification example of the first post-processing apparatus.

In the above-described embodiment, the lead-out portion 203 which configures the first post-processing apparatus 200 is not limited to the configuration of being formed to be higher than the lead-in portion 202 in the vertical direction Z. For example, as illustrated in FIG. 16, a configuration of being formed to have substantially the same height as that of the lead-in portion 202, and to be lower than the lead-in portion 202, may be employed. In a case where the lead-out portion 203 have substantially the same height as that of the lead-in portion 202 in the vertical direction Z, the upper surface portion 201*b* can cover the entire upper part of the first housing 201.

In the above-described embodiment, the second post-processing apparatus 300 may be configured to load the paper sheet P on the paper discharge portion 302 without performing the post-processing in the second housing 301 with respect to the paper sheet P transported from the first post-processing apparatus 200.

The above-described embodiment is not limited to the configuration in which the guiding mechanism 180 is controlled by the control portion which is provided in the printer 100 and is not illustrated. For example, a configuration in which a lever which operates the guiding mechanism 180 is provided in the recording apparatus side housing 101, and the upper position and the lower position of the first guiding portion 181 and the second guiding portion 182 that configure the guiding mechanism 180, are manually switched, may be employed.

The above-described embodiment is not limited to the configuration in which the second discharge path 152 more straightly extends along the common discharge path 154. For example, a configuration of extending being inclined slightly upward in the vertical direction Z, a configuration of extending being inclined downward, or a configuration of extending being slightly curved, may be employed.

The above-described embodiment is not limited to the configuration in which the third discharge path 153 extends downward from the common discharge path 154. For example, the third discharge path 153 may extend straightly forward in the vertical direction Z, may extend to be inclined upward, or may extend to be slightly curved.

The above-described embodiment is not limited to the configuration in which the lead-in path 211 penetrates the side surface of the first housing 201 and extends. For example, a configuration in which the lead-in path 211 penetrates the upper surface and extends, may be employed. In this case, the paper sheet P is mounted on a part on the second post-processing apparatus 300 side rather than the part at which the lead-in path 211 penetrates in the upper surface portion 201*b*.

In the above-described embodiment, it is also possible to make the upper surface portion 201*b* so that the upper surface of the first plate-like member 201*c* in the first positional state is inclined. For example, when approaching the second post-processing apparatus 300 from the printer 100, it is also possible to configure the upper surface portion 201*b* to be inclined upward from below. In addition, for example, when approaching the second post-processing apparatus 300 from the printer 100, it is also possible to configure the upper surface portion 201*b* to be inclined downward from above. In addition, it is also possible to make the upper surface of the upper surface portion 201*b* to be bent at the intermediate part.

In the above-described embodiment, a configuration in which the recess portion 203*b* is not provided in the extending portion 203*a* in the lead-out portion 203 of the first post-processing apparatus 200, may be employed. In other words, the second plate-like member 201*d* may be omitted, and the upper surface portion 201*b* which covers the upper part of the first post-processing apparatus 200 may be configured only of the first plate-like member 201*c* which shuts the upward opening portion of the main body portion 201*a*. Otherwise, the upward opening portion of the main body portion 201*a* may be formed to have a size that reaches the inside of the recess portion 203*b*, and the first plate-like member 201*c* which configures the entire upper surface portion 201*b* may be attachable to and detachable from the upward opening portion.

In the above-described embodiment, it is possible to attach and detach the first plate-like member 201*c* to and from the main body portion 201*a*. In this case, by attaching the first plate-like member 201*c* to the main body portion 201*a*, the first positional state is formed, and by detaching the first plate-like member 201*c* from the main body portion 201*a*, the second positional state is formed. In other words, when the upper part of the first post-processing apparatus 200 is configured to be exposed, the first plate-like member 201*c* can employ any configuration.

In the above-described embodiment, it is also possible to fix and provide the first plate-like member 201*c* in the main body portion 201*a*. In this case, the upper surface portion 201*b* and the main body portion 201*a* can be formed to be integrated with each other.

In the above-described embodiment, it is possible to attach the second plate-like member 201*d* to the main body portion 201*a* to be movable (for example, rotatable by using the hinge) with respect to the main body portion 201*a*. In addition, it is possible to attach the second plate-like member 201*d* to be attachable and detachable to and from the main body portion 201*a*.

In the above-described embodiment, the branch path 160 and the first discharge path 151 may be configured to be commonly used as one path in the printer 100.

In the above-described embodiment, the third supply path 143 may be configured to extend to pass through the lower side of the recording portion 110 in the vertical direction Z.

In the above-described embodiment, it is possible to appropriately change a configuration of the intermediate transport path 210. The intermediate transport path 210 of the embodiment ensures the length necessary for drying the paper sheet P by performing the switching of reversing and transporting the paper sheet P, and by meandering in the intermediate transport path 210. However, additionally, it is also possible to ensure the drying time by stopping the transporting of the paper sheet P, or by making the transporting speed slow. In addition, by selecting at least one of performing of the switching of reversing and transporting the paper sheet P, meandering in the intermediate transport path 210, stopping the transporting of the paper sheet P, and making the transporting speed of the paper sheet P slow, it is also possible to gain the time necessary for drying the paper sheet P. In other words, when a configuration in which the predetermined transporting time is gained so that the paper sheet P is dried is employed, it is also possible to change the embodiment to any configuration.

In the above-described embodiment, it is also possible not to make the linking path 219 curved on the printer 100 side. In this case, the linking path 219 has a shape in which a part on the upstream side extends straightly forward in the vertical direction Z in the extending portion 203*a*, for example, and the part on the downstream side is curved toward the second post-processing apparatus 300 in the upstream end portion of the extending portion 203*a*.

The above-described embodiment is not limited to the configuration in which the paper sheet P is supported by using the outer circumferential surface of the belt 135 provided in the belt transport portion 132 as the supporting surface when the recording portion 110 performs the recording on the paper sheet P. For example, a configuration in which a supporting table is provided, and the paper sheet P is supported by using a surface that is an upper side of the supporting table in the vertical direction Z as the supporting surface, may be employed.

The above-described embodiment is not limited to the configuration in which the transport portion 130 which transports the paper sheet P along the transport path 120 is the transport roller pair 131. For example, a configuration in which the transport portion 130 is a conveyor, may be employed.

In the above-described embodiment, the recording head 111 provided in the recording portion 110 is not limited to the line head type, and may be a serial head type which can move along the width direction that intersects the transport direction of the paper sheet P.

In the above-described embodiment, the recording apparatus may be a liquid ejecting apparatus which performs the recording by ejecting or dispensing fluid (liquid, a liquid body in which particles of a functional material are dispersed or mixed into the liquid, or a flowing body, such as gel) other than the ink. For example, the recording apparatus may be a liquid body ejecting apparatus which performs the recording by ejecting the liquid body that includes a material, such as an electrode material or coloring material (pixel material), which is used in manufacturing or the like liquid crystal display, electro-luminescence (EL) display, and surface light emission display, by being dispersed or dissolved. In addition, the recording apparatus may be a flowing body ejection apparatus which ejects the flowing body, such as gel (for example, physical gel). In addition, the invention can be employed in any one type of the fluid ejection apparatuses. In addition, the "fluid" in the specification is a concept which does not include fluid made of only gas, and examples of the fluid include liquid (including inorganic solvent, organic solvent, solution, liquid resin, liquid metal (melt metal), and the like), the liquid body, and the flowing body.

This application is a continuation of U.S. application Ser. No. 17/215,541, filed Mar. 29, 2021, which is a continuation of U.S. application Ser. No. 16/560,709, filed Sep. 4, 2019, now U.S. Pat. No. 11,001,055, which is a continuation of U.S. application Ser. No. 15/995,938, filed Jun. 1, 2018, now U.S. Pat. No. 10,471,708, which is a continuation of U.S. application Ser. No. 15/368,228, filed Dec. 2, 2016, now U.S. Pat. No. 10,052,867, which claims priority to Japanese Patent Application No. 2015-237229, filed Dec. 4, 2015, all of which are expressly incorporated by reference herein.

What is claimed is:

1. A recording system comprising:

a recording apparatus that records images on a media;

a first post-processing apparatus that performs a first post-processing on the media on which images have been recorded by the recording apparatus; and a second post-processing apparatus that performs a second post-processing on the media that has undergone the first post-processing by the first post-processing apparatus, the first post-processing apparatus comprising:

an opening portion through which the media can be pulled out and provided in a side wall of the first post-processing apparatus;

a first switchback path for reversing the media as part of the intermediate transport path that transports the media to the second post-processing apparatus, wherein the opening portion allows the media to be pulled out horizontally on the first switchback path; and a second switchback path for reversing the media as part of the intermediate transport path, wherein when the first post-processing apparatus and the second post-processing apparatus are aligned in an alignment direction, the opening portion and the first switchback path overlap in the alignment direction in the side view, and wherein the opening portion and the second switchback path overlap in a vertical direction in a lateral view.

2. A recording system comprising:

a recording apparatus that records images on a media;

a first post-processing apparatus that performs a first post-processing on the media on which images have been recorded by the recording apparatus; and a second post-processing apparatus that performs a second post-processing on the media that has undergone the first post-processing by the first post-processing apparatus, the first post-processing apparatus comprising:

an opening portion through which the media can be pulled out and provided in a side wall of the first post-processing apparatus;

a first switchback path for reversing the media as part of the intermediate transport path that transports the media to the second post-processing apparatus, wherein the opening portion allows the media to be pulled out horizontally on the first switchback path; and a second switchback path for reversing the media as part of the intermediate transport path that transports the media to the second post-processing apparatus, wherein the opening portion and the second switchback path overlap in the vertical direction in the lateral view.

3. The recording system according to claim 2, wherein a first joining path is connected to the upstream end of the first switchback path, a second joining path is connected to the upstream end of the second switchback path, and a lead-out path is connected to the first joining path and the second joining path and extend to the second post-processing apparatus, and when the first post-processing apparatus and the second post-processing apparatus are aligned in the alignment direction, the opening portion and the lead-out path overlap in the alignment direction in the side view.

4. The recording system according to claim 3, wherein the opening portions and the lead-out paths are vertically overlapped in the lateral view.

5. The recording system according to claim 3, wherein when the first and second post-processing apparatus are aligned in the alignment direction, the opening portion and the first joining path overlap in the alignment direction in the side view.

6. The recording system according to claim 3, wherein when the first and second post-processing apparatus are aligned in the alignment direction, the opening portion and the second joining path overlap in the alignment direction in the side view.

7. The recording system according to claim 3, wherein the lead-out path and the second switchback path overlap in the vertical direction in the lateral view.

8. The recording system according to claim 3, wherein when the first post-processing apparatus and the second post-processing apparatus are aligned in the alignment direction, the lead-out path and the first switchback path overlap in the alignment direction in the side view.

9. A transporting device comprising:

an intermediate transport path for transporting a media on which images have been recorded by a recording apparatus to a post-processing apparatus, the intermediate transport path transports the media along the intermediate transport path;

an opening portion through which the media can be pulled out and provided in a side wall of the transporting device;

a first switchback path for reversing the media as part of the intermediate transport path, wherein the opening portion allows the media to be pulled out horizontally on the first switchback path; and a second switchback path for reversing the media as part of the intermediate transport path, wherein when the direction in which the transport apparatus and the post-processing apparatus are aligned is an alignment direction, the opening portion and the first switchback path overlap in the alignment direction in the side view, and wherein the opening portion and the second switchback path are overlapped in a vertical direction in a side view.

10. The transport apparatus according to claim 9, wherein a first joining path is connected to the upstream end of the first switchback path, a second joining path is connected to the upstream end of the second switchback path, the first joining path and the second joining path are connected to the first joining path and the second joining path and extend to the post-processing apparatus, and when the transport apparatus and the post-processing apparatus are aligned in the alignment direction, the opening portion and the lead-out path overlap in the alignment direction in the side view.

11. The transport apparatus according to claim 10, wherein the opening portion and the lead-out path overlap in the vertical direction in the lateral view.

12. The transport apparatus according to claim 11, wherein when the direction in which the transport apparatus and the post-processing apparatus are aligned is the alignment direction, the opening portion and the first joining path overlap in the alignment direction in the side view.

13. The transport apparatus according to claim 11, wherein when the direction in which the transport apparatus and the post-processing apparatus are aligned is the alignment direction, the opening portion and the second joining path overlap in the alignment direction in the side view.

14. The transport apparatus according to claim 11, wherein the lead-out path and the second switchback path overlap in the vertical direction in the lateral view.

15. The transport apparatus according to claim 11, wherein when the direction in which the transport apparatus and the post-processing apparatus are aligned the alignment direction, the lead-out path and the first switchback path overlaps in the alignment direction in the side view.

* * * * *